United States Patent
Hojo

(10) Patent No.: US 11,279,428 B2
(45) Date of Patent: Mar. 22, 2022

(54) SADDLE RIDING VEHICLE

(71) Applicant: HONDA MOTOR CO., LTD., Tokyo (JP)

(72) Inventor: Masayuki Hojo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 200 days.

(21) Appl. No.: 16/788,537

(22) Filed: Feb. 12, 2020

(65) Prior Publication Data

US 2020/0298923 A1 Sep. 24, 2020

(30) Foreign Application Priority Data

Mar. 20, 2019 (JP) .............................. JP2019-052938

(51) Int. Cl.
- *B62J 15/02* (2006.01)
- *B60R 13/10* (2006.01)
- *B62K 11/02* (2006.01)
- *B62K 25/28* (2006.01)

(52) U.S. Cl.
CPC ............ *B62J 15/02* (2013.01); *B60R 13/105* (2013.01); *B62K 11/02* (2013.01); *B62K 25/283* (2013.01)

(58) Field of Classification Search
CPC ...................................................... B62J 15/02
See application file for complete search history.

(56) References Cited

U.S. PATENT DOCUMENTS

| | | | | |
|---|---|---|---|---|
| 7,832,751 B2 * | 11/2010 | Fischer | .................... | B62J 15/00 280/154 |
| 9,156,517 B2 * | 10/2015 | Kaita | ........................ | B62J 1/12 |
| 2001/0004150 A1 * | 6/2001 | Murayama | ............... | B62H 1/02 280/287 |
| 2007/0235979 A1 * | 10/2007 | Lin | .......................... | B62H 1/04 280/293 |
| 2012/0080908 A1 * | 4/2012 | Wellman | .............. | B62D 25/186 296/198 |
| 2013/0001387 A1 * | 1/2013 | Chiang | .................... | B62J 15/02 248/222.14 |
| 2014/0291961 A1 * | 10/2014 | Kaita | ......................... | B62J 1/12 280/304.5 |
| 2016/0297497 A1 * | 10/2016 | Nolin | ...................... | B62L 1/005 |
| 2016/0368340 A1 * | 12/2016 | Nolin | ..................... | B60G 7/001 |

(Continued)

FOREIGN PATENT DOCUMENTS

| | | |
|---|---|---|
| CN | 205837039 U | 12/2016 |
| EP | 3 378 751 | 9/2018 |
| GB | 908694 | 10/1962 |

(Continued)

OTHER PUBLICATIONS

European Search Report dated Aug. 20, 2020, 10 pages.
Indian Office Action dated Dec. 14, 2021, English translation included, 6 pages.

*Primary Examiner* — Erez Gurari

(74) *Attorney, Agent, or Firm* — Rankin, Hill & Clark LLP

(57) ABSTRACT

A saddle riding vehicle includes a swing arm swingably supported on a vehicle body, a rear wheel supported by the swing arm, and a rear fender covering the rear wheel from an upper side, the rear fender being supported rotatably. In the saddle riding vehicle, the rear fender is supported by the swing arm, and the rear fender is supported rotatably in a vehicle width direction by a rotating section.

13 Claims, 21 Drawing Sheets

(56) References Cited

U.S. PATENT DOCUMENTS

2017/0021885 A1* 1/2017 Montague ................. B62H 1/04
2020/0298923 A1* 9/2020 Hojo ........................ B62J 15/02

FOREIGN PATENT DOCUMENTS

| JP | S57-110570 | 7/1982 |
| JP | S58-58988 U | 4/1983 |
| JP | S62-173384 A | 7/1987 |
| JP | S63-94885 U | 6/1988 |

* cited by examiner

SADDLE RIDING VEHICLE

INCORPORATION BY REFERENCE

The present application claims priority under 35 U.S.C. § 119 to Japanese Patent Application No. 2019-052938 filed on Mar. 20, 2019. The content of the application is incorporated herein by reference in its entirety.

TECHNICAL FIELD

The present invention relates to a saddle riding vehicle.

BACKGROUND ART

Hitherto, there has been known a saddle riding vehicle including a swing arm swingably supported on a vehicle body, a rear wheel supported by the swing arm, and a rear fender covering the rear wheel from an upper side, the rear fender being supported rotatably (see, for example, Patent Document 1). In Patent Document 1, the rear fender is provided rotatably in the vertical direction, for permitting easy replacement of the rear wheel.

PRIOR ART DOCUMENT

Patent Document

[Patent Document 1]
Japanese Patent Laid-open No. Sho 57-110570

SUMMARY OF THE INVENTION

Problem to be Solved by the Invention

However, in the above-mentioned conventional saddle riding vehicle, when the rear fender is rotated in the vertical direction, a license plate holder and the like rotated as one body with the rear fender serve as obstacles, and the rotating range of the rear fender is thereby limited. Therefore, the rear fender may obstruct maintenance work such as replacement of the rear wheel.

The present invention has been made in consideration of the above-mentioned circumstances. It is an object of the present invention to enable a rear fender to be largely retracted relative to a rear wheel and to enable maintenance work such as replacement of the rear wheel to be carried out easily.

Means for Solving the Problem

A saddle riding vehicle includes: a swing arm (13) swingably supported on a vehicle body; a rear wheel (3) supported by the swing arm (13); and a rear fender (25, 225, 325, 425) covering the rear wheel (3) from an upper side, the rear fender (25, 225, 325, 425) being supported rotatably, in which the rear fender (25, 225, 325, 425) is supported by the swing arm (13), and the rear fender (25, 225, 325, 425) is supported rotatably in a vehicle width direction by a rotating section (33).

In addition, in the aforementioned configuration, a rotational axis (33c) of the rotating section (33) may be directed at least in either of a longitudinal vehicle direction or a vertical direction, in side view of the vehicle.

Besides, in the aforementioned configuration, the rotating section (33) may be located on an outer side in the vehicle width direction relative to the rear wheel (3).

Further, in the aforementioned configuration, the saddle riding vehicle may include: a first stay (31, 231L, 331, 431) extending from the swing arm (13) toward an outer circumference side of the rear wheel (3); and a second stay (32, 232, 332, 432) rotatably connected to the first stay (31, 231L, 331, 431) through the rotating section (33), in which the rear fender (25, 225, 325, 425) may be fixed to the second stay (32, 232, 332, 432).

In addition, in the aforementioned configuration, a fastener (40a, 40b, 340a, 340b, 440a, 440b) for fastening the first stay (31, 231L, 331, 431) and the second stay (32, 232, 332, 432) may be provided detachably, and rotation of the second stay (32, 232, 332, 432) by the rotating section (33) may be restricted by the fastener (40a, 40b, 340a, 340b, 440a, 440b).

Besides, in the aforementioned configuration, the rear fender (25, 225, 325, 425) may be co-fastened with the second stay (32, 232, 332, 432) by the fastener (40a, 40b, 340a, 340b, 440a, 440b).

In addition, in the aforementioned configuration, the rear fender (25, 225, 325, 425) may be fastened to the second stay (32, 232, 332, 432) by a fender fastener (47a, 47b, 47c) provided separately from the fastener (40a, 40b, 340a, 340b, 440a, 440b).

Besides, in the aforementioned configuration, the rotating section (33) may be a shaft inserted in and passed through the first stay (31, 231L, 331, 431), and the second stay (32, 232, 332, 432) may be connected to both ends of the shaft.

In addition, in the aforementioned configuration, the rotating section (33) may be a shaft inserted in and passed through the first stay (31, 231L), the second stay (32, 232) may be connected to both ends of the shaft, the first stay (31, 231L) may include an extension section (39d) extending to the rear fender (25, 225) side as compared to a part where the shaft is provided, and the fastener (40a, 40b) may be fastened to the extension section (39d).

Further, in the aforementioned configuration, at least part of the extension section (39d) may be covered by the second stay (32, 232) from an outer side in the vehicle width direction.

In addition, in the aforementioned configuration, a holding mechanism (53) for holding a rotational position of the rear fender (25) at a predetermined position may be provided, the holding mechanism (53) may include a hole (53a), a ball (53b) engaged with the hole (53a), and a biasing member (53) for biasing the ball (53b) toward the hole (53a), and the ball (53b) may be engaged with the hole (53a) when the rear fender (25) is located at the predetermined position.

Besides, in the aforementioned configuration, a harness (60) may be laid in such a manner as to lie along inside surfaces in the vehicle width direction of the first stay (31) and the second stay (32), a first cover (61) covering the rotating section (33) and the harness (60) from an inner side in the vehicle width direction may be attached to the first stay (31), while a second cover (62) covering the rotating section (33) and the harness (60) from an inner side in the vehicle width direction may be attached to the second stay (32), and the first cover (61) and the second cover (62) may overlap with each other in the vehicle width direction.

In addition, in the aforementioned configuration, a tiltable section (55) rotated in the vehicle width direction with the rotating section (33) as a center may include at least the rear fender (25), and in a state in which the tiltable section (55) is rotated most greatly to an outer side in the vehicle width direction, a center of gravity (G) of the tiltable section (55) may be located on an outer side in the vehicle width direction as compared to a rotational center of the rotating section (33), as viewed along an axial direction of the rotating section (33).

Effects of the Invention

The saddle riding vehicle includes the swing arm swingably supported on the vehicle body, the rear wheel supported by the swing arm, and the rear fender covering the rear wheel from an upper side, in which the rear fender is supported rotatably, the rear fender is supported by the swing arm, and the rear fender is supported rotatably in the vehicle width direction by the rotating section.

According to this configuration, the rear fender can be largely retracted relative to the rear wheel by rotating the rear fender in the vehicle width direction through the rotating section. Therefore, it becomes easy to perform maintenance work such as replacement of the rear wheel.

In addition, in the aforementioned configuration, the rotational axis of the rotating section may be directed at least in either of the longitudinal vehicle direction or the vertical direction, in side view of the vehicle.

According to this configuration, the rear fender can be rotated in the vehicle width direction with the rotational axis of the rotating section as a center, and the rear fender can be largely retracted relative to the rear wheel.

Besides, in the aforementioned configuration, the rotating section may be located on the outer side in the vehicle width direction relative to the rear wheel.

According to this configuration, since the rear fender is rotated in the vehicle width direction through the rotating section located on the outer side in the vehicle width direction relative to the rear wheel, the rear fender can be largely retracted relative to the rear wheel.

Further, in the aforementioned configuration, the saddle riding vehicle may include the first stay extending from the swing arm toward the outer circumference side of the rear wheel, and the second stay rotatably connected to the first stay through the rotating section, and the rear fender may be fixed to the second stay.

According to this configuration, the rear fender can be provided rotatably in the vehicle width direction at the position on the outer circumference side of the rear wheel, by the first stay and the second stay.

In addition, in the aforementioned configuration, the fastener for fastening the first stay and the second stay may be provided detachably, and the rotation of the second stay by the rotating section may be restricted by the fastener.

According to this configuration, the rotation of the second stay and the rear fender can be restricted with a simple structure by the fastener fastening the first stay and the second stay.

Besides, in the aforementioned configuration, the rear fender may be co-fastened with the second stay by the fastener.

According to this configuration, the rear fender can be fixed by utilizing the fastener for restricting the rotation of the second stay, so that the number of component parts can be reduced.

In addition, in the aforementioned configuration, the rear fender may be fastened to the second stay by a fender fastener provided separately from the fastener.

According to this configuration, even in a state in which the fastener is detached to make the second stay rotatable, the rear fender can be kept fixed to the second stay by the fender fastener.

Besides, in the aforementioned configuration, the rotating section may be a shaft inserted in and passed through the first stay, and the second stay may be connected to both ends of the shaft.

According to this configuration, since the second stay is connected to both ends of the shaft, the first stay and the second stay can be connected firmly to each other through the shaft.

In addition, in the aforementioned configuration, the rotating section may be a shaft inserted in and passed through the first stay, the second stay may be connected to both ends of the shaft, the first stay may include an extension section extending to the rear fender side as compared to a part where the shaft is provided, and the fastener may be fastened to the extension section.

According to this configuration, the first stay and the second stay can be fastened firmly to each other with a simple structure. Besides, since the extension section is provided on the first stay side, the second stay which is the side to be rotated can be lightened in weight.

Further, in the aforementioned configuration, at least part of the extension section may be covered by the second stay from an outer side in the vehicle width direction.

According to this configuration, the extension section can be hidden behind the second stay from the outer side in the vehicle width direction, so that the external appearance property of the saddle riding vehicle is good.

In addition, in the aforementioned configuration, a holding mechanism for holding the rotational position of the rear fender at a predetermined position may be provided, the holding mechanism may include a hole, a ball engaged with the hole, and a biasing member biasing the ball toward the hole, and the ball may be engaged with the hole when the rear fender is located at the predetermined position.

According to this configuration, the rotational position of the rear fender can be held at the predetermined position by the holding mechanism.

Besides, in the aforementioned configuration, a harness may be laid in such a manner as to lie along inside surfaces in the vehicle width direction of the first stay and the second stay, a first cover covering the rotating section and the harness from an inner side in the vehicle width direction may be attached to the first stay, a second cover covering the rotating section and the harness from an inner side in the vehicle width direction may be attached to the second stay, and the first cover and the second cover may overlap with each other in the vehicle width direction.

According to this configuration, the harness can be hidden and external appearance property can be thereby enhanced, and the rotating section and the harness can be protected from flying stones, water, and the like by the first cover and the second cover.

In addition, in the aforementioned configuration, a tiltable section rotated in the vehicle width direction with the rotating section as a center may include at least the rear fender, and, in a state in which the tiltable section is rotated most greatly to an outer side in the vehicle width direction, the center of gravity of the tiltable section may be located on the outer side in the vehicle width direction as compared to the rotational center of the rotating section, in a view along the axial direction of the rotating section.

According to this configuration, the tiltable section can be kept in the state of being most greatly rotated to the outer side in the vehicle width direction by a balance of the center of gravity.

MODES FOR CARRYING OUT THE INVENTION

Figure 1:
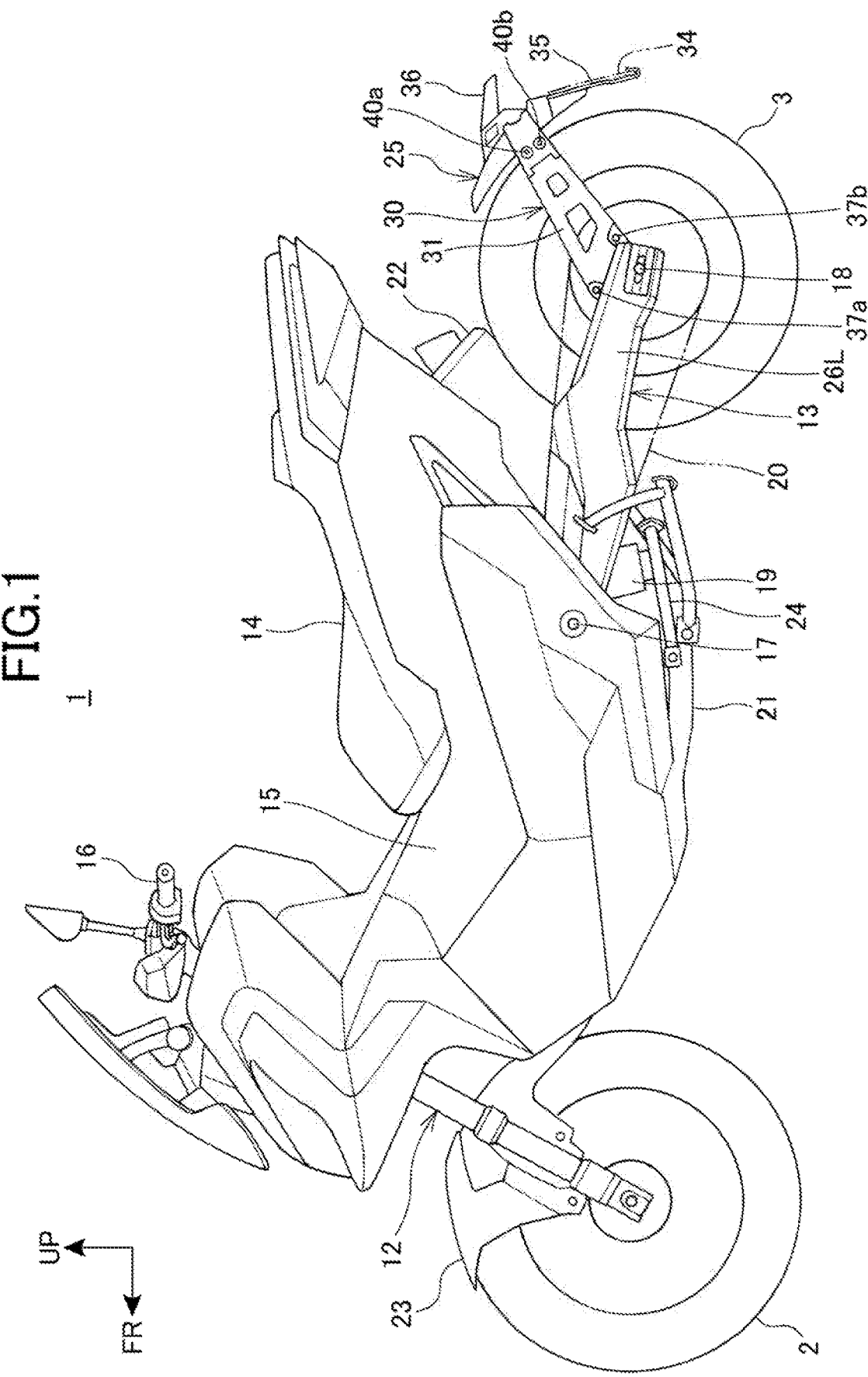
FIG. 1 is a left side view of a two-wheeled motor vehicle according to a first embodiment of the present invention.

Embodiments of the present invention will be described below, referring to the drawings. Note that the descriptions of the directions such as forward, rearward, leftward, rightward, upward, and downward are the same as those with respect to the vehicle body, unless specified otherwise. In addition, symbol FR in each drawing indicates the front side of the vehicle body, symbol UP indicates the upper side of the vehicle body, and symbol LH indicates the left-hand side of the vehicle body.

First Embodiment

FIG. 1 is a left side view of a two-wheeled motor vehicle according to a first embodiment of the present invention.

A two-wheeled motor vehicle 1 is a vehicle in which an engine (not illustrated) as a power unit is supported on a body frame (not illustrated), a front fork 12 supporting a front wheel 2 in a steerable manner is supported on a front end of the body frame in a steerable manner, and a swing arm 13 supporting a rear wheel 3 is provided at a rear portion of the body frame 10.

The two-wheeled motor vehicle 1 is a saddle riding vehicle in which a rider is seated astride a seat 14, and the seat 14 is provided at an upper surface portion of a rear portion of the two-wheeled motor vehicle 1.

The body frame constituting the vehicle body and the engine are substantially entirely covered by a body cover 15.

The front wheel 2 is shaft-supported on a lower end portion of the front fork 12. A steering handlebar 16 is attached to an upper end portion of the front fork 12.

At a rear portion of the body frame, a pivot shaft 17 extending in the vehicle width direction is provided. A front end portion of the swing arm 13 is supported on the pivot shaft 17, and the swing arm 13 can be swung up and down, with the pivot shaft 17 as a center.

The rear wheel 3 is shaft-supported by an axle 18 provided at a rear end portion of the swing arm 13.

The swing arm 13 is suspended from the vehicle body through a rear suspension 19.

The engine is disposed on the rear side of the front fork 12 and on a front lower side of the seat 14.

Output power of the engine is transmitted to the rear wheel 3 by a chain 20 arranged between an output shaft (not illustrated) of the engine and the rear wheel 3. The chain 20 is disposed on one side (left side) in the vehicle width direction relative to the rear wheel 3.

An exhaust pipe 21 of the engine extends rearward by passing a lower side of the engine, and is connected to a muffler 22 which is disposed on the other side in the vehicle width direction relative to the rear wheel 3.

The two-wheeled motor vehicle 1 includes a side stand 24 supporting the vehicle body during parking.

The front wheel 2 is covered from above by a front fender 23 attached to the front fork 12.

The two-wheeled motor vehicle 1 includes a rear fender 25 covering the rear wheel 3 from above.

Figure 2:
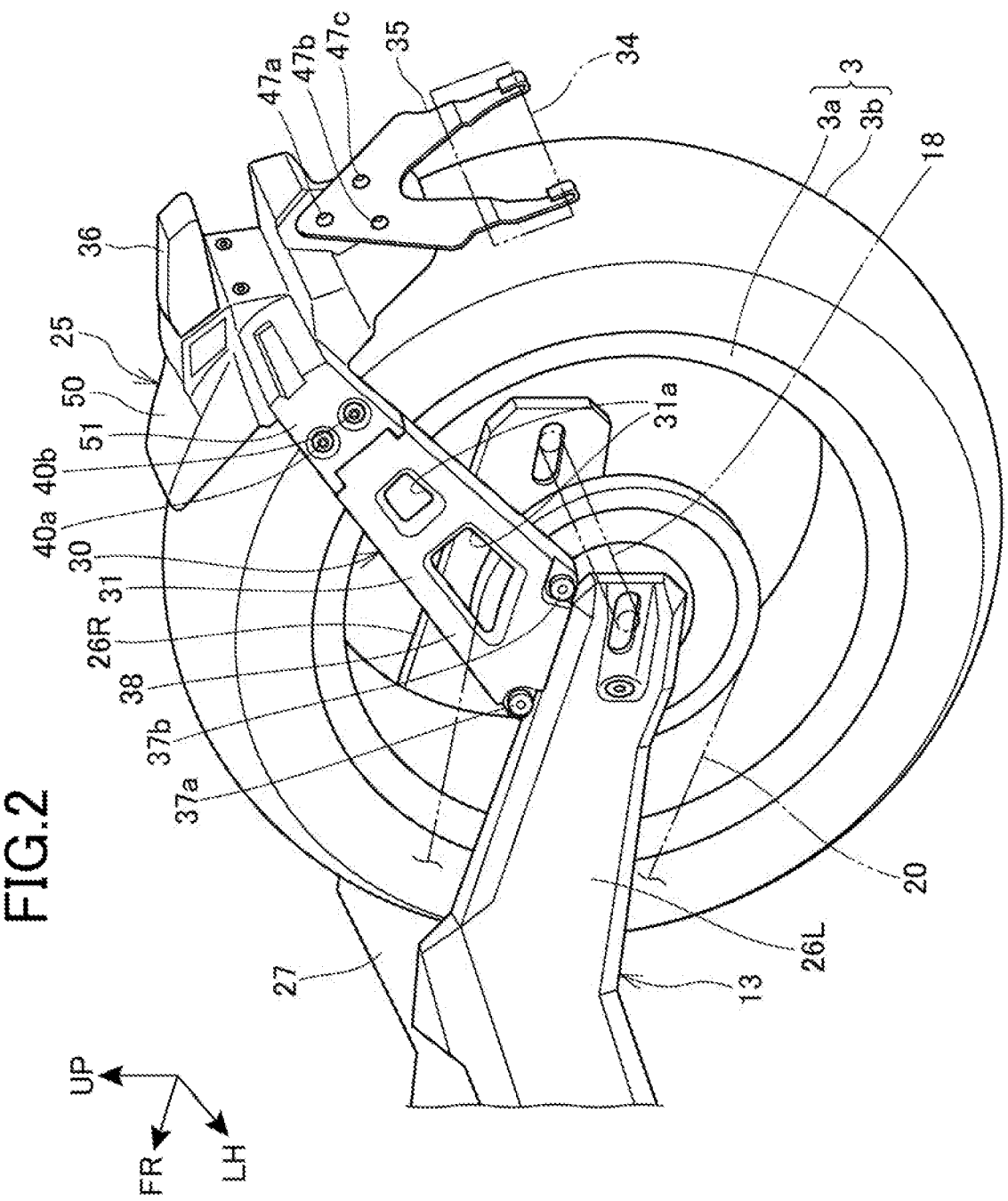
FIG. 2 is a perspective view, from a left side, of a support structure for a rear fender.
Figure 3:
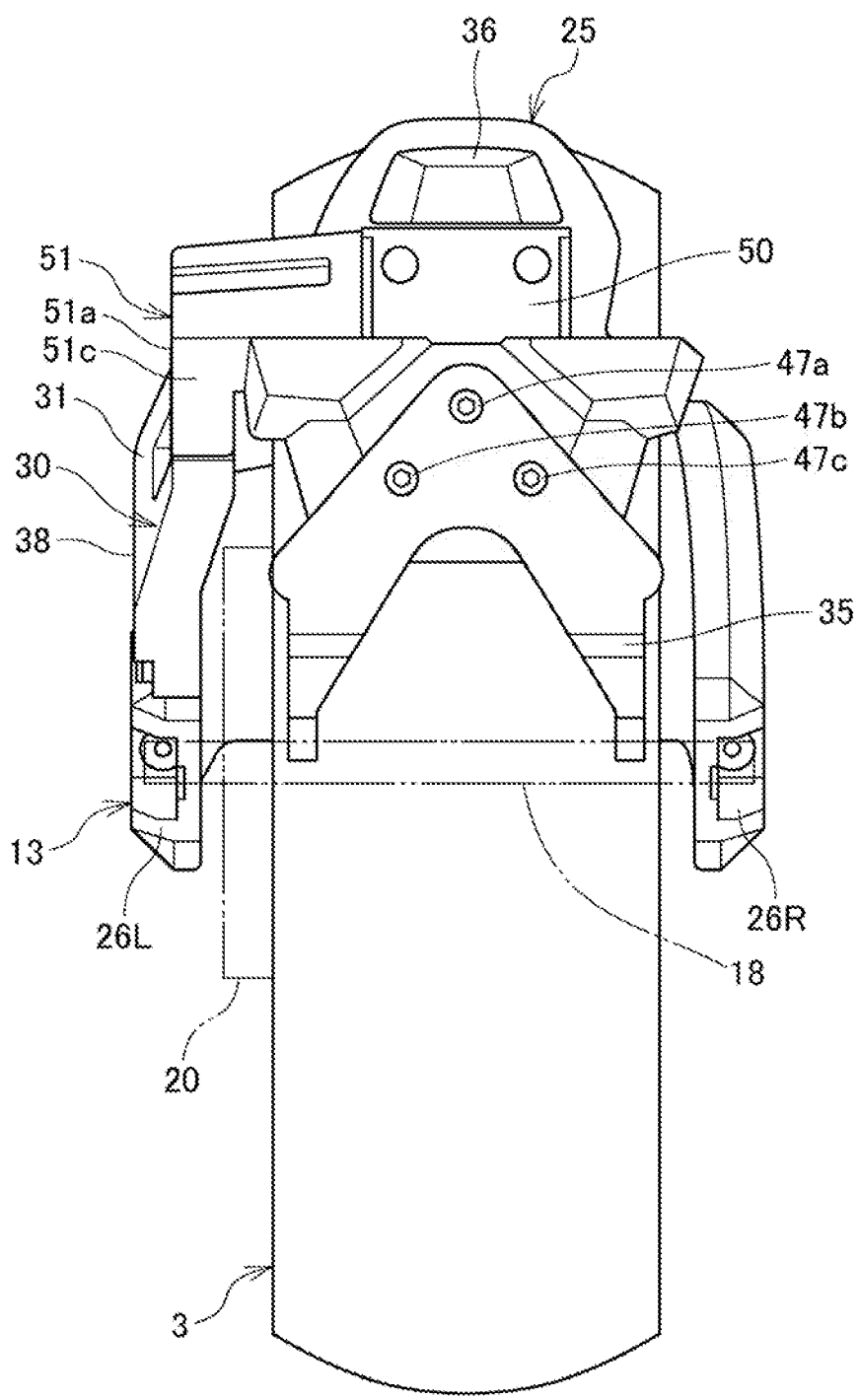
FIG. 3 is a view, from a rear side, of the support structure for the rear fender.

FIG. 2 is a perspective view, from a left side, of a support structure for the rear fender 25. FIG. 3 is a view, from a rear side, of the support structure for the rear fender 25.

Referring to FIGS. 1 to 3, the swing arm 13 includes a pair of left and right arm sections 26L and 26R, and a cross member 27 interconnecting the left and right arm sections 26L and 26R in the vehicle width direction on the rear side of the pivot shaft 17.

The pivot shaft 17 is inserted in and passed through front end portions of the arm sections 26L and 26R. The axle 18 interconnects rear end portions of the arm sections 26L and 26R in the vehicle width direction. The rear wheel 3 is disposed between the left and right arm sections 26L and 26R, and is supported by the axle 18.

The chain 20 passes the upper and lower sides of the arm section 26L on one (left side) of the left and right sides.

The rear wheel 3 includes a wheel 3a supported by the axle 18, and a tire 3b attached to an outer circumference of the wheel 3a.

The two-wheeled motor vehicle 1 includes a support member 30 extending rearwardly upward from a rear end portion of the swing arm 13. The rear fender 25 is rotatably supported by the support member 30.

Figure 4:
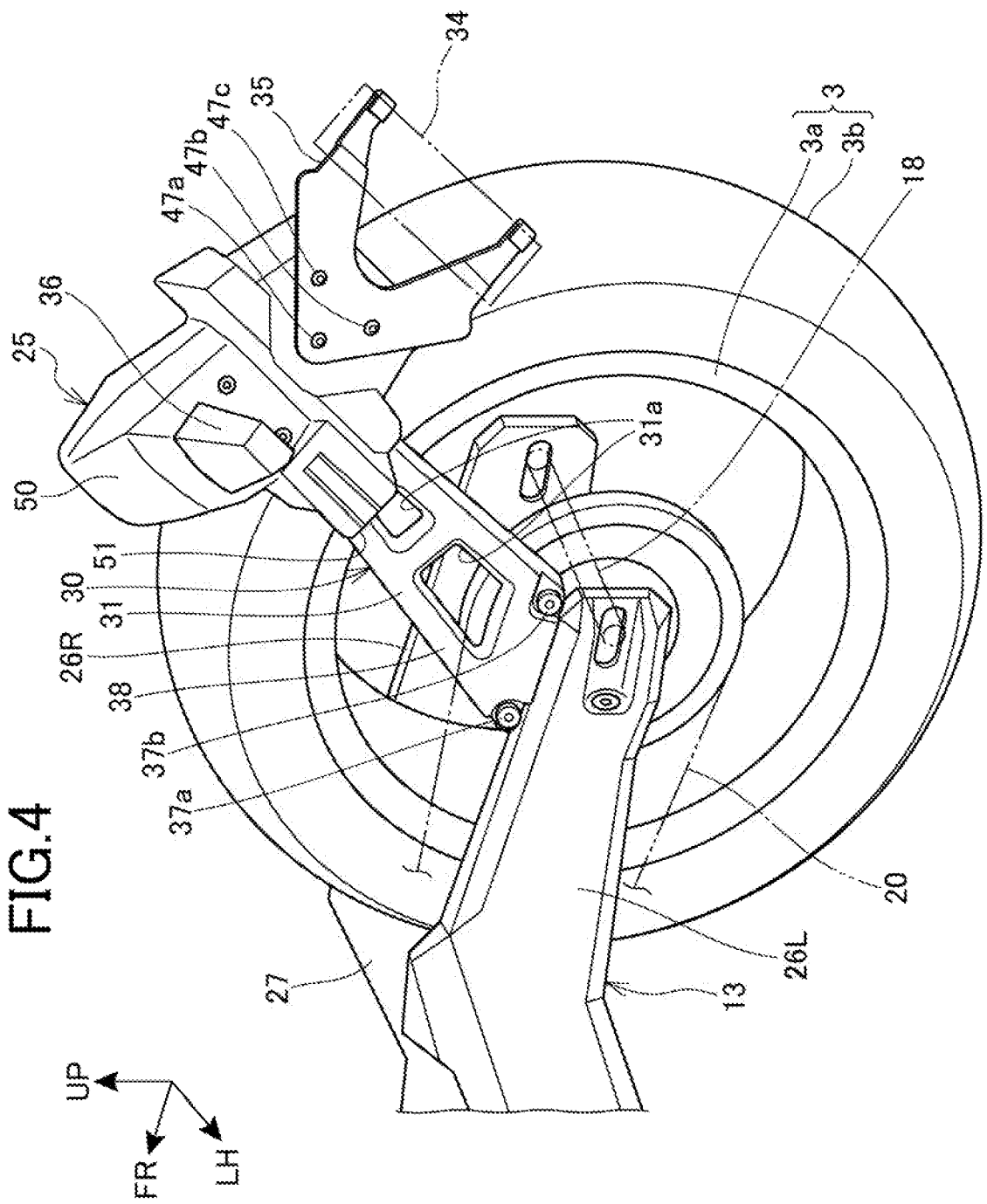
FIG. 4 is a perspective view depicting a state in which the rear fender is rotated.

FIG. 4 is a perspective view depicting a state in which the rear fender 25 is rotated.

Referring to FIGS. 2 and 4, the rear fender 25 is provided to be rotatable in the vehicle width direction, and, as depicted in FIG. 4, can be retracted to an outer side in the vehicle width direction relative to the rear wheel 3.

Figure 5:
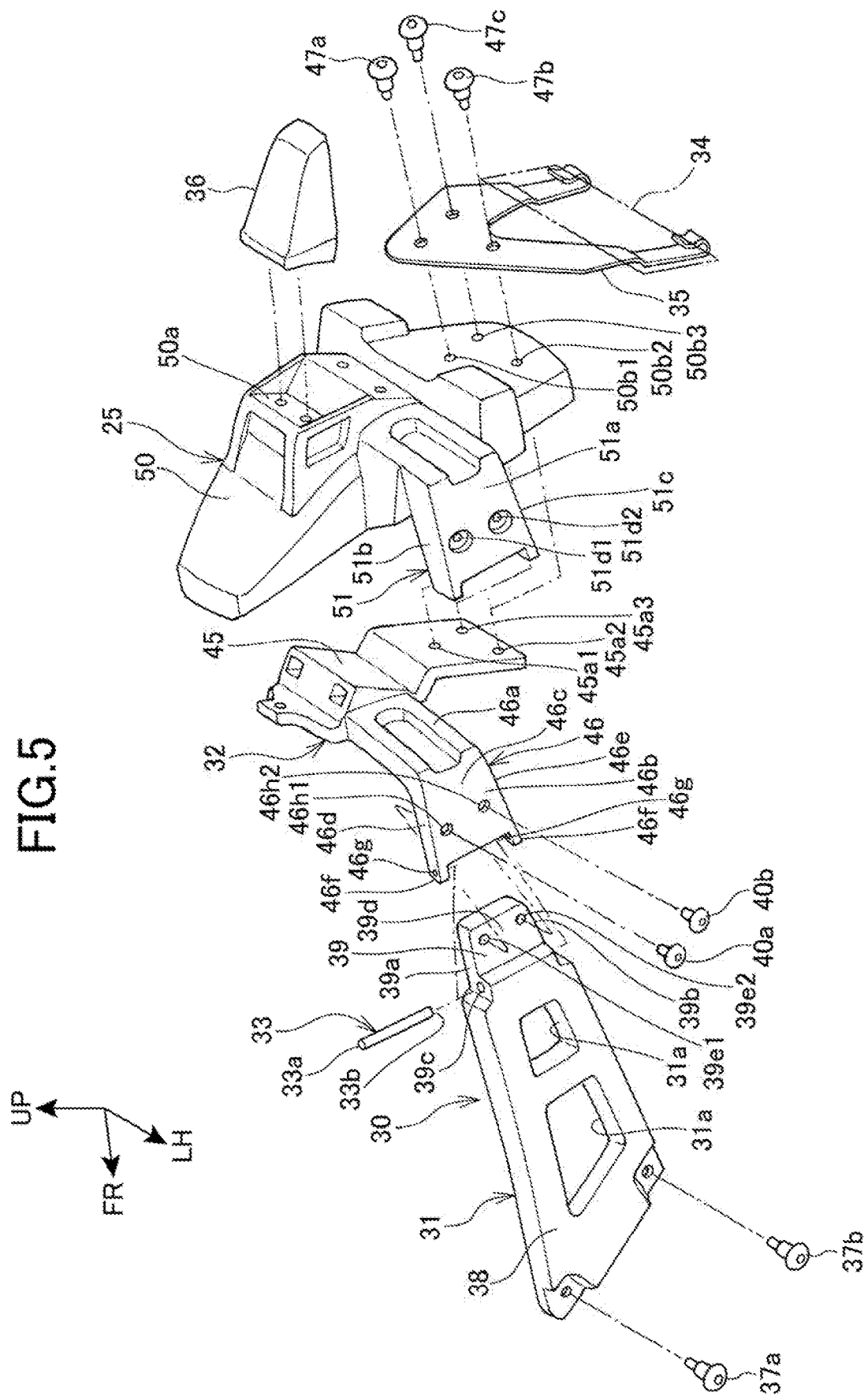
FIG. 5 is an exploded perspective view of the support structure for the rear fender.

FIG. 5 is an exploded perspective view of the support structure for the rear fender 25.

Referring to FIGS. 2 to 5, the support member 30 includes a first stay 31 fixed to the swing arm 13, a second stay 32 provided to be rotatable in the vehicle width direction relative to the first stay 31, and a rotating section 33 rotatably connecting the second stay 32 to the first stay 31.

The rear fender 25 is attached to a rear surface of the second stay 32. A holder 35 for holding a license plate 34 and a lamp 36 for illuminating the license plate 34 from above are attached to the rear fender 25.

Figure 6:
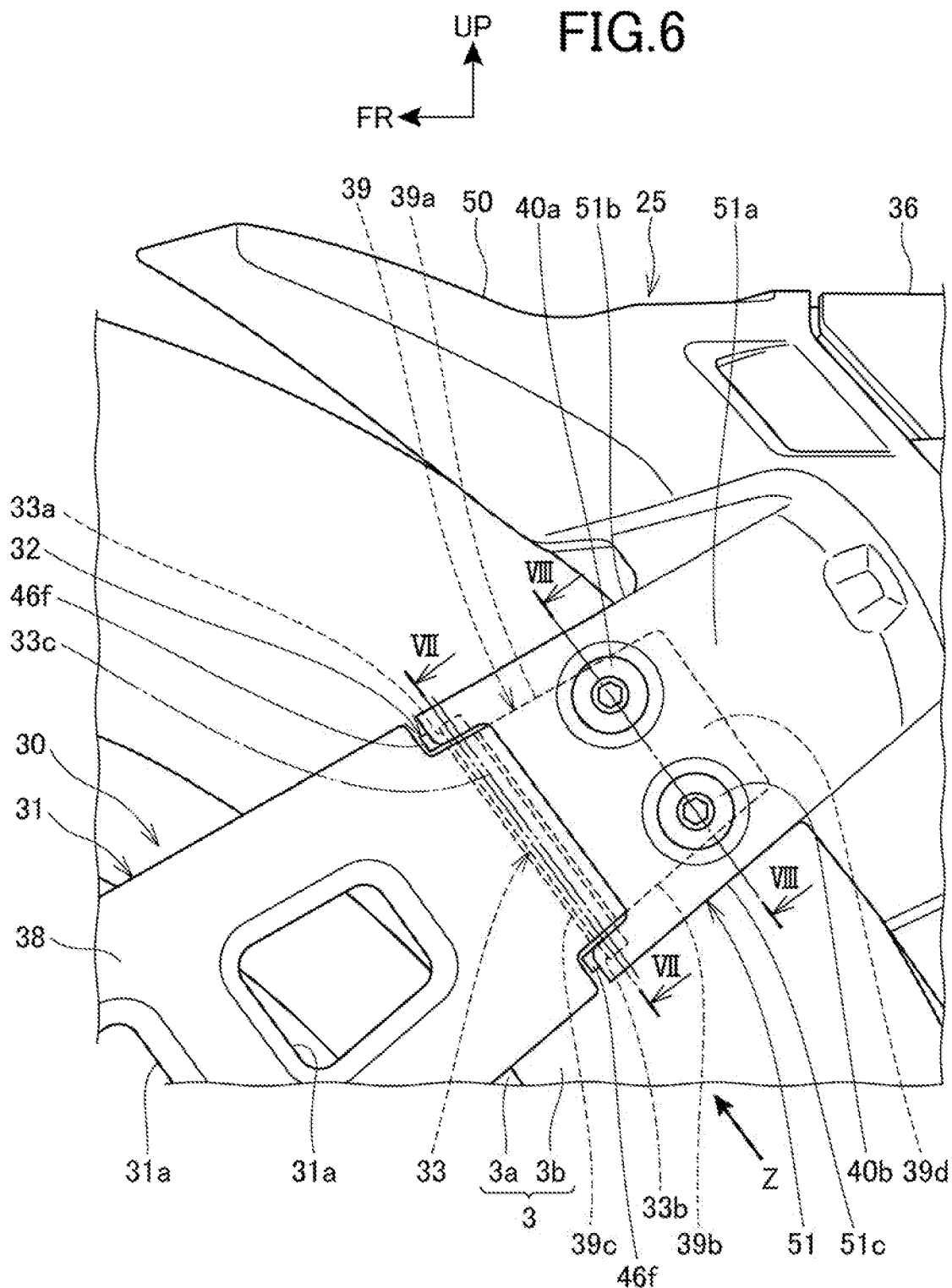
FIG. 6 is a side view, from a left side, of a support member and the rear fender.

FIG. 6 is a side view, from a left side, of the support member 30 and the rear fender 25.

Referring to FIGS. 2 to 6, the first stay 31 extends obliquely from an upper portion of a rear end portion of a left-side arm section 26L toward a rear upper side through an outer side of the rear wheel 3. The first stay 31 is a plate member extending from a rear end portion of the left-side arm section 26L toward the outer circumference of the rear wheel 3, to an outer side in a radial direction of the rear wheel 3. A rear end portion (upper end portion) of the first stay 31 is located on an outer side of the tire 3b.

The support member 30 is fixed to one of the left and right arm sections 26L and 26R, and supports the rear fender 25 in a cantilever fashion.

The first stay 31 is fastened to an upper portion of the left-side arm section 26L by a plurality of stay fasteners 37a and 37b which are inserted in and passed through a lower end portion of the stay 31 from an outer side in the vehicle width direction. The stay fasteners 37a and 37b are disposed in the state of being aligned on the front and rear sides. A lower end portion of the first stay 31 is provided on an outer side in the vehicle width direction as compared to the chain 20.

The first stay 31 includes a lightening section 31a that penetrates the first stay 31 in the vehicle width direction.

The first stay 31 includes a main body section 38 extending in a radial direction of the rear wheel 3 from the left-side arm section 26L, and a connection section 39 which is provided at a rear end of the main body section 38 and to which the second stay 32 is connected.

An upper surface of the connection section 39 forms an upper-side stepped section 39a located below an upper surface of the main body section 38. A lower surface of the connection section 39 forms a lower-side stepped section 39b located above a lower surface of the main body section 38. In other words, the vertical width of the connection section 39 is smaller than the vertical width of the main body section 38.

The upper-side stepped section 39a and the lower-side stepped section 39b are inclined surfaces which are inclined rearwardly upward in side view of the vehicle.

A front end portion of the connection section 39 is provided with a support hole 39c which vertically penetrates the connection section 39 from the upper-side stepped section 39a to the lower-side stepped section 39b. The support hole 39c is provided in the posture of being inclined rearwardly downward in side view of the vehicle.

The connection section 39 includes an extension section 39d which extends toward the rear fender 25 on the rear side to the rear side as compared to the support hole 39c. An upper surface of the extension section 39d is the upper-side stepped section 39a, and a lower surface of the extension section 39d is the lower-side stepped section 39b.

The extension section 39d is provided with a plurality of fixing holes 39e1 and 39e2 to which fasteners 40a and 40b for fixing the second stay 32 to the first stay 31 are fastened. The fastener 40b is located on a rear lower side of the fastener 40a.

The rotating section 33 is a shaft which is inserted in and passed through the support hole 39c in the connection section 39 of the first stay 31.

The second stay 32 integrally includes a fender support section 45 which covers an upper surface of a rear portion of the rear wheel 3 from a rear upper side, and a first stay connection section 46 connected to the first stay 31.

The fender support section 45 is a plate-shaped member which extends longer in the vertical direction than in the left-right direction.

A plurality of fastening sections 45a1, 45a2, and 45a3 to which fender fasteners 47a, 47b, and 47c for fixing the rear fender 25 to the second stay 32 are fastened are provided at a lower portion of the fender support section 45. The fender fasteners 47b and 47c are disposed in the state of being aligned on the left and right side on a lower side of the fender fastener 47a.

The first stay connection section 46 of the second stay 32 includes a plate-shaped side extension section 46a which extends outward in the vehicle width direction from an upper portion of the fender support section 45 toward the first stay 31 side, and a plate-shaped front extension section 46b which extends forwardly downward from an outer end of the side extension section 46a.

The front extension section 46b includes a side wall section 46c covering the extension section 39d of the first stay 31 from an outer side in the vehicle width direction, an upper wall section 46d extending inward in the vehicle width direction from an upper edge of the side wall section 46c, and a lower wall section 46e extending inward in the vehicle width direction from a lower edge of the side wall section 46c.

A pair of upper and lower connection pieces 46f extending forwardly downward is provided at an upper end and a lower end of a front edge portion of the front extension section 46b. The connection pieces 46f are provided with connection holes 46g which vertically penetrate the connection pieces 46f.

A plurality of fixing holes 46h1 and 46h2 in and through which the fasteners 40a and 40b are inserted and passed are provided on a rear side of the connection pieces 46f in the side wall section 46c of the front extension section 46b.

The rear fender 25 integrally includes a fender main body 50 which covers an upper surface of a rear portion of the rear wheel 3 from a rear upper side, and a cover section 51 which extends forwardly downward from a side portion on one of the left and right sides of the fender main body 50.

A lamp fixing section 50a to which the lamp 36 is attached is provided at an upper portion of a rear surface of the fender main body 50.

A plurality of holder fixing hole sections 50b1, 50b2, and 50b3 to which the holder 35 is attached are provided at a lower portion of the rear surface of the fender main body 50. The fender fasteners 47a, 47b, and 47c are inserted in and passed through the holder fixing hole sections 50b1, 50b2, and 50b3.

The cover section 51 of the rear fender 25 includes a cover side wall section 51a which covers the connection section 39 of the first stay 31 from an outer side in the vehicle width direction, a cover upper wall section 51b extending inward in the vehicle width direction from an upper edge of the cover side wall section 51a, and a cover lower wall section 51c extending inward in the vehicle width direction from a lower edge of the cover side wall section 51a.

The cover side wall section 51a is provided with a plurality of fixing holes 51d1 and 51d2 that penetrate the cover side wall section 51a in the vehicle width direction. The fixing hole 51d2 is located on a rear lower side of the fixing hole 51d1.

Figure 7:
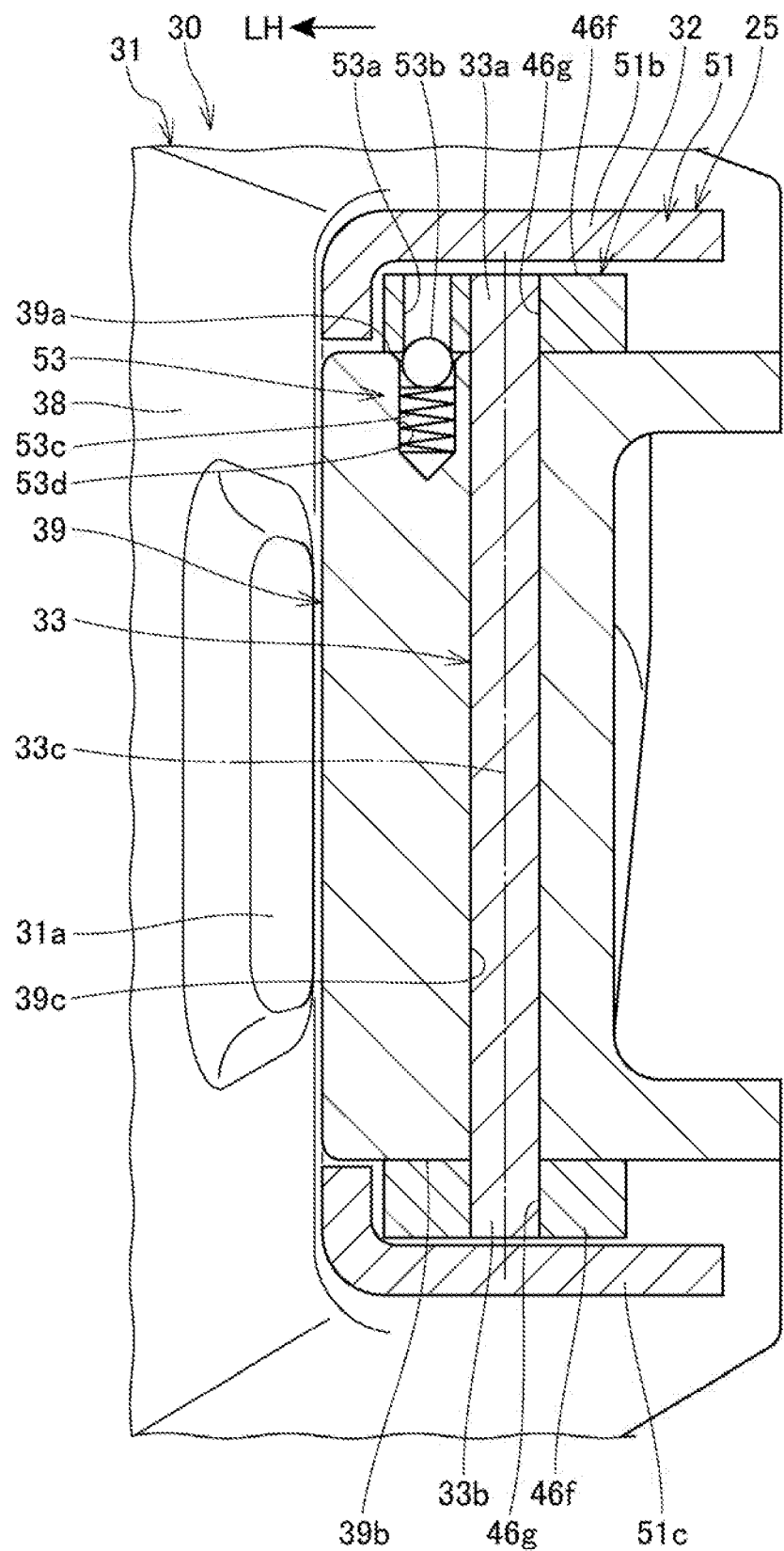
FIG. 7 is a sectional view taken along line VII-VII of FIG. 6.

FIG. 7 is a sectional view taken along line VII-VII of FIG. 6.

Referring to FIGS. 5 to 7, the rotating section 33 is inserted in and passed through the support hole 39c in the connection section 39 of the first stay 31, one end portion 33a in the axial direction of the rotating section 33 projects upward from the upper-side stepped section 39a, and the other end portion 33b in the axial direction of the rotating section 33 projects downward from the lower-side stepped section 39b.

The upper and lower connection pieces 46f of the second stay 32 are fitted to the one end portion 33a and the other end portion 33b, constituting both ends, of the rotating section 33, thereby being connected to the rotating section 33. The rotating section 33 is retained in the support hole 39c by, for example, a ring-shaped clip (not illustrated) engaged with a shaft end of the rotating section 33.

A rotational axis 33c of the rotating section 33 is a straight line extending in the longitudinal vehicle direction and the vertical direction, and is inclined rearwardly downward in side view of the vehicle. In other words, the rotational axis 33c is directed in the longitudinal vehicle direction and the vertical direction.

The rotating section 33 is disposed on an outer side in the vehicle width direction relative to the rear wheel 3. In side view of the vehicle, the rotating section 33 is provided at such a position as to overlap with the tire 3b from an outer side in the vehicle width direction.

The second stay 32 is rotated in the vehicle width direction, with the rotational axis 33c as a center. In other words, the rear fender 25 attached to the second stay 32 can be rotated in the vehicle width direction together with the second stay 32, with the rotational axis 33c, located on an outer side in the vehicle width direction relative to the rear wheel 3, as a center.

In addition, the rear fender 25 is supported by the swing arm 13 through the support member 30, and is swung together with the swing arm 13.

The cover upper wall section 51b of the cover section 51 of the rear fender 25 covers the upper-side connection piece 46f and one end portion 33a of the rotating section 33 from upper and outer sides. Besides, the cover lower wall section 51c of the cover section 51 covers the lower-side connection piece 46f and the other end portion 33b of the rotating section 33 from lower and outer sides.

Therefore, the connection pieces 46f and the rotating section 33 can be protected by the cover section 51, and the connection pieces 46f and the rotating section 33 can be hidden behind the cover section 51, thereby enhancing external appearance property.

Figure 8:
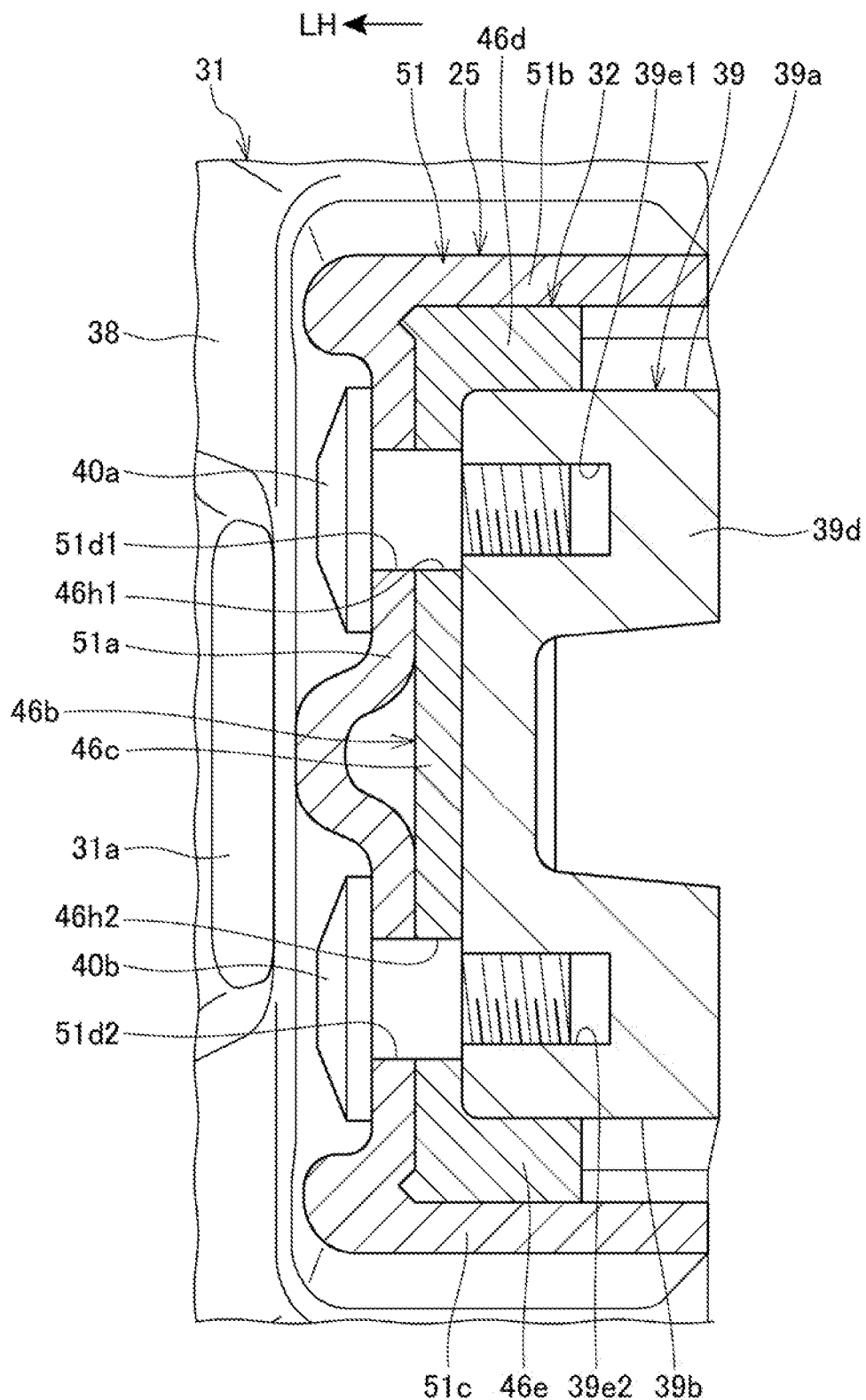
FIG. 8 is a sectional view taken along line VIII-VIII of FIG. 6.

FIG. 8 is a sectional view taken along line VIII-VIII of FIG. 6.

Referring to FIGS. 5, 6 and 8, the front extension section 46b of the second stay 32 and the cover section 51 of the rear fender 25 are co-fastened to the extension section 39d of the first stay 31 by the fasteners 40a and 40b.

The fasteners 40a and 40b are inserted in and passed through the fixing holes 51d1 and 51d2 in the cover section 51 and the fixing holes 46h1 and 46h2 in the second stay 32 from an outer side in the vehicle width direction, and are fastened to the fixing holes 39e1 and 39e2 in the extension section 39d.

The rotation of the second stay 32 with the rotational axis 33c as a center is restricted by fastening of the second stay 32 to the extension section 39d by the fasteners 40a and 40b.

In a state in which the fasteners 40a and 40b are fastened, the front extension section 46b of the second stay 32 has the side wall section 46c making contact with an outside surface of the extension section 39d. In addition, the upper wall section 46d of the front extension section 46b makes contact with the upper-side stepped section 39a of the extension section 39d, and the lower wall section 46e of the front extension section 46b makes contact with the lower-side stepped section 39n of the extension section 39d. With the extension section 39d of the first stay 31 thus clamped between the upper wall section 46d and the lower wall section 46e of the second stay 32 from the upper and lower sides, the second stay 32 can be connected to the first stay 31 with high rigidity.

In the state in which the fasteners 40a and 40b are fastened, the cover section 51 of the rear fender 25 has the cover side wall section 51a covering the front extension section 46b of the second stay 32 and the extension section 39d of the first stay 31 from an outer side in the vehicle width direction, has the cover upper wall section 51b covering the front extension section 46b and the extension section 39d from an upper side, and has the cover lower wall section 51c covering the front extension section 46b and the extension section 39d from a lower side.

Therefore, the extension section 39d and the second stay 32 can be hidden behind the cover section 51, realizing a good external appearance property.

The rear fender 25 is, in whole, formed to be larger than the second stay 32, and covers a substantially whole part of the second stay 32 from rear and lateral sides. Therefore, it is difficult to visually recognize the second stay 32 from the outside, and a good external appearance property is realized.

The rear fender 25 and the second stay 32 are provided as separate bodies, and the second stay 32 is formed using a material higher in strength than the material for the rear fender 25. Therefore, the rear fender 25 can be supported firmly by the second stay 32, and the rear fender 25 can be formed using an ordinary material.

When the plurality of fasteners 40a and 40b are all detached, the restriction on the rotation of the second stay 32 is released, so that it becomes possible to rotate the rear fender 25 in the vehicle width direction together with the second stay 32.

As illustrated in FIG. 5, the rear fender 25 is fastened to the second stay 32 by the fender fasteners 47a, 47b, and 47c provided at separate positions from the fasteners 40a and 40b. Even in a state in which the fasteners 40a and 40b are detached, therefore, the rear fender 25 can be kept fixed to the second stay 32.

The holder 35 is co-fastened to the second stay 32 together with the rear fender 25 by the fender fasteners 47a, 47b, and 47c.

As depicted in FIG. 7, the support member 30 includes a holding mechanism 53 that holds the rotational position of the rear fender 25 at a predetermined position.

The holding mechanism 53 includes a hole 53a provided in the connection piece 46f, a ball 53b engaged with the hole 53a, a biasing member 53c that biases the ball 54b toward the hole 53a, and an accommodating section 53d that accommodates the ball 53b and the biasing member 53c.

The accommodating section 53d is a hole provided in the upper-side stepped section 39a of the first stay 31. The ball

53b is pressed against the lower surface side of the connection piece 46f by the biasing member 53c provided in the accommodating section 53d.

When the rotational position of the rear fender 25 is brought to the predetermined position, the hole 53a in the connection piece 46f overlaps with the position of the ball 53b, so that the ball 53b is engaged with the hole 53a.

As a result, the rotational position of the rear fender 25 can be held at the predetermined position by the ball 53b, and a click feeling can be imparted to a rotating operation of the rear fender 25, so that good operability is realized.

Figure 9:
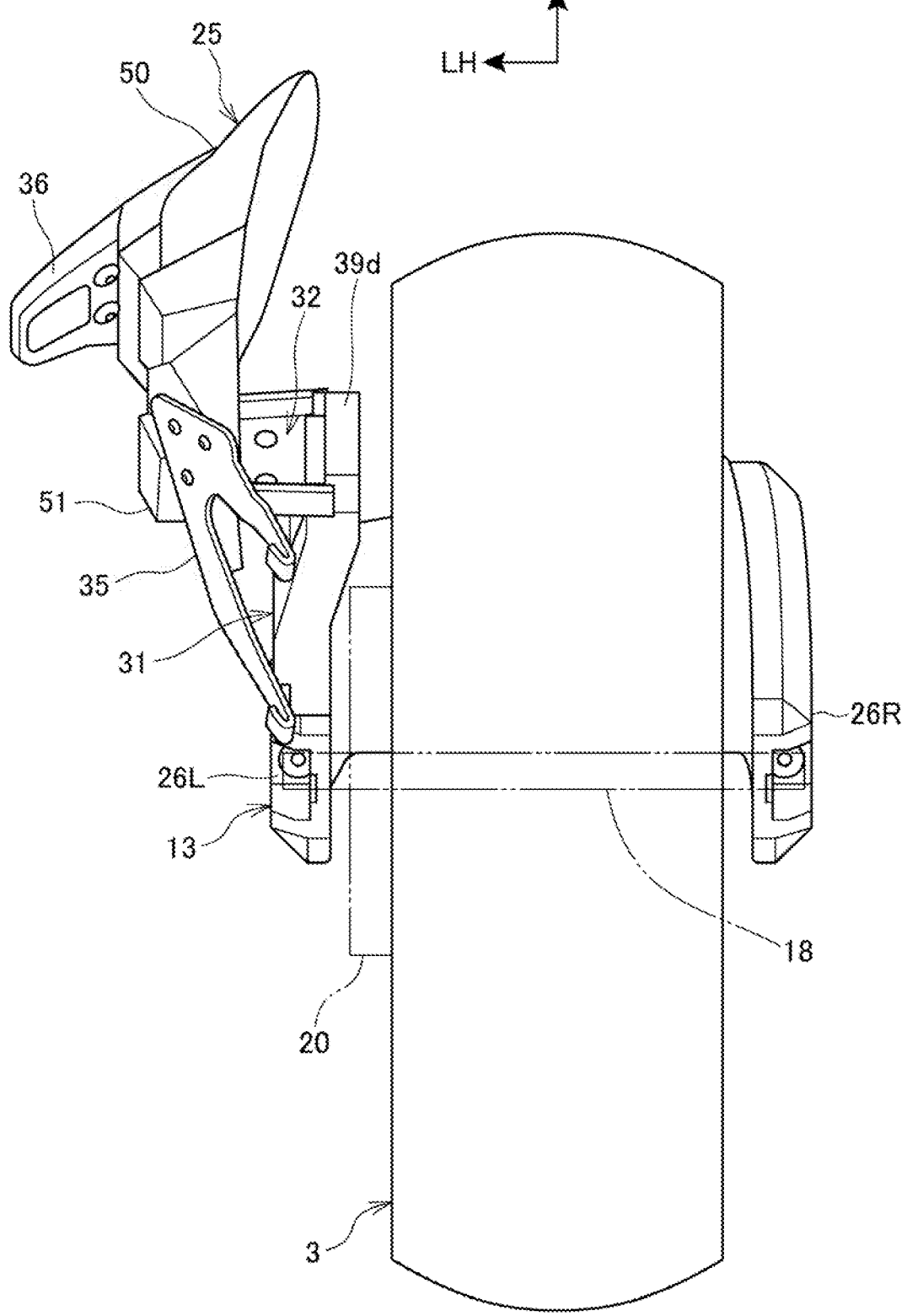
FIG. 9 is a view, from a rear side, of a state in which the rear fender is rotated toward an outer side in a vehicle width direction.

FIG. 9 is a view, from a rear side, of a state in which the rear fender 25 is rotated to an outer side in the vehicle width direction.

In a state of FIG. 3, the rear fender 25 is located just on the rear side of an upper portion of the rear wheel 3.

When the rear fender 25 is rotated to the outer side in the vehicle width direction with the rotational axis 33c (FIG. 6) as a center from the state of FIG. 3, the rear fender 25 is moved to the outer side in the vehicle width direction and is retracted from the rear wheel 3, as depicted in FIG. 9.

Specifically, in a state in which the rear fender 25 is rotated to the most outer side in the vehicle width direction, as illustrated in FIG. 9, the second stay 32 and the rear fender 25 do not overlap with the rear wheel 3 and are located at positions spaced outward from the rear wheel 3, in rear view.

In this state, the second stay 32 and the rear fender 25 are not present in the moving course when the axle 18 is detached and the rear wheel 3 is drawn out from between the left and right arm sections 26L and 26R; therefore, the rear wheel 3 can be drawn out rearward from between the left and right arm sections 26L and 26R and detached.

In addition, even in this state, the rear fender 25 is connected to the vehicle body side through the rotating section 33, so that it is easy to return the rear fender 25 into the state of FIG. 3.

The holding mechanism 53 of FIG. 7 is configured such that when the rear fender 25 is brought into the rotational position of being rotated to the most outer side in the vehicle width direction as illustrated in FIG. 9, the ball 53a is engaged with the hole 53a. In other words, the predetermined position concerning the rotation of the rear fender 25 is the rotational position where the rear fender 25 is rotated to the most outer side in the vehicle width direction.

Figure 10:
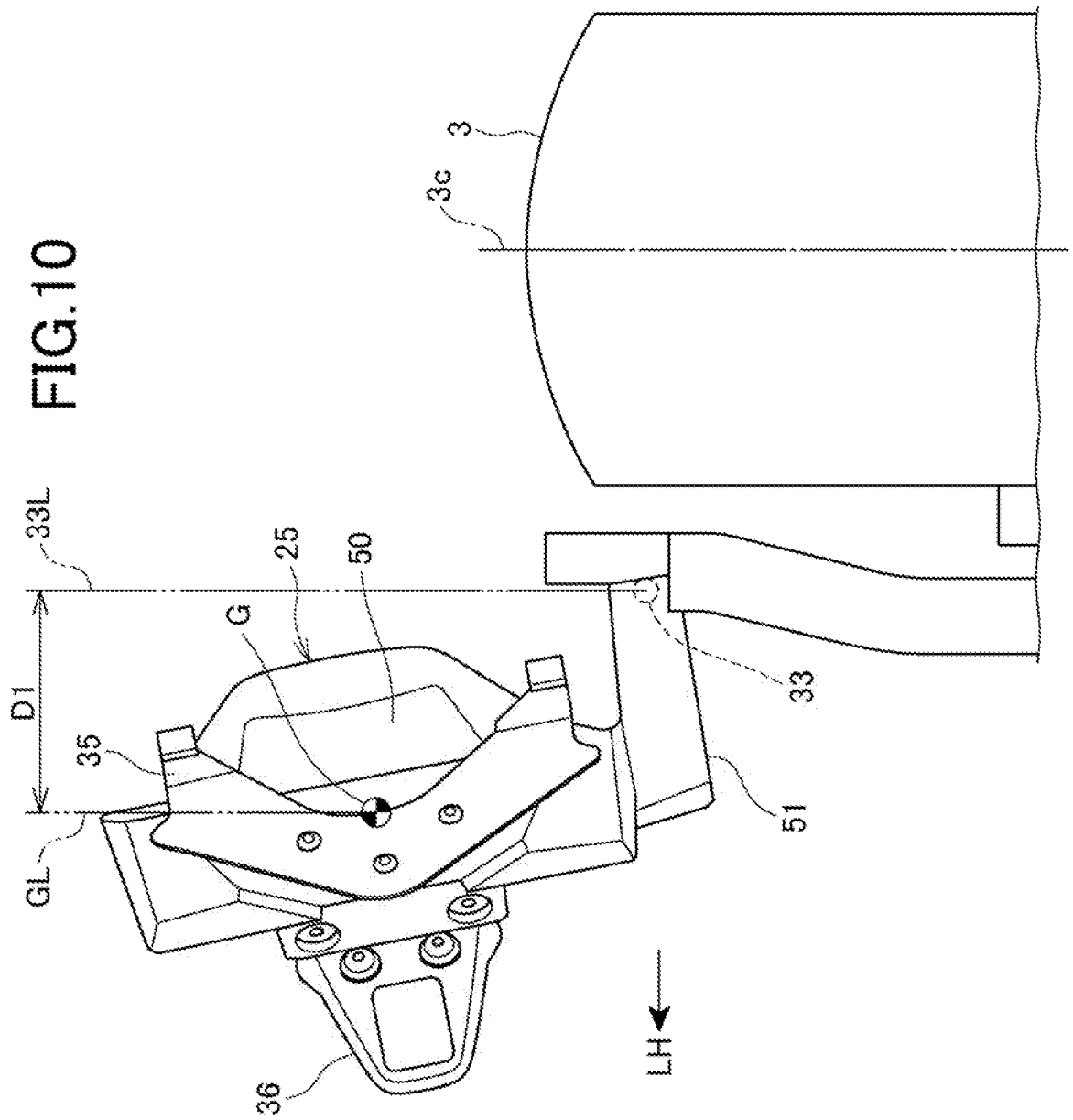
FIG. 10 is a view along arrow Z of FIG. 6.

FIG. 10 is a view along arrow Z of FIG. 6, and is a view in which the rear fender 25, the support member 30, and the like are viewed in the axial direction of the rotational axis 33c from a lower side.

Referring to FIG. 10, the second stay 32, the rear fender 25, the holder 35, and the lamp 36 constitute a tiltable section 55 which is rotated with the rotational axis 33c of the rotating section 33 as a center and tilted in the vehicle width direction. FIG. 10 depicts a center of gravity G of the tiltable section 55. The rotating section 33 is located on an outer side in the vehicle width direction relative to a center line 3c in the vehicle width direction of the rear wheel 3. Here, in FIG. 10, an imaginary line GL is a straight line parallel to the center line 3c and passing through the center of gravity G, and an imaginary line 33L is a straight line parallel to the center line 3c and passing through the rotational center of the rotating section 33.

As illustrated in FIG. 10, in a state in which the rear fender 25 is rotated to the most outer side in the vehicle width direction, the center of gravity G of the tiltable section 55 is spaced by a distance D1 toward the outer side in the vehicle width direction from the rotational center of the rotating section 33, in a view along the axial direction of the rotating section 33.

As a result, the tiltable section 55 is naturally kept in the state of being rotated to an outer side in the vehicle width direction, by the weight of the tiltable section 55. Therefore, the state in which the tiltable section 55 is rotated to the outer side in the vehicle width direction can easily be maintained, and workability is good.

Here, while a state in which the rear wheel 3 (vehicle body) is erected vertically relative to the ground surface is depicted in FIG. 10, even in a state in which the two-wheeled motor vehicle 1 is parked in the state of being inclined to the left side by use of the side stand 24, the tiltable section 55 is naturally kept in the state of being rotated to the outer side in the vehicle width direction, if the center of gravity G is located on an outer side in the vehicle width direction relative to the rotational center of the rotating section 33.

Figure 11:
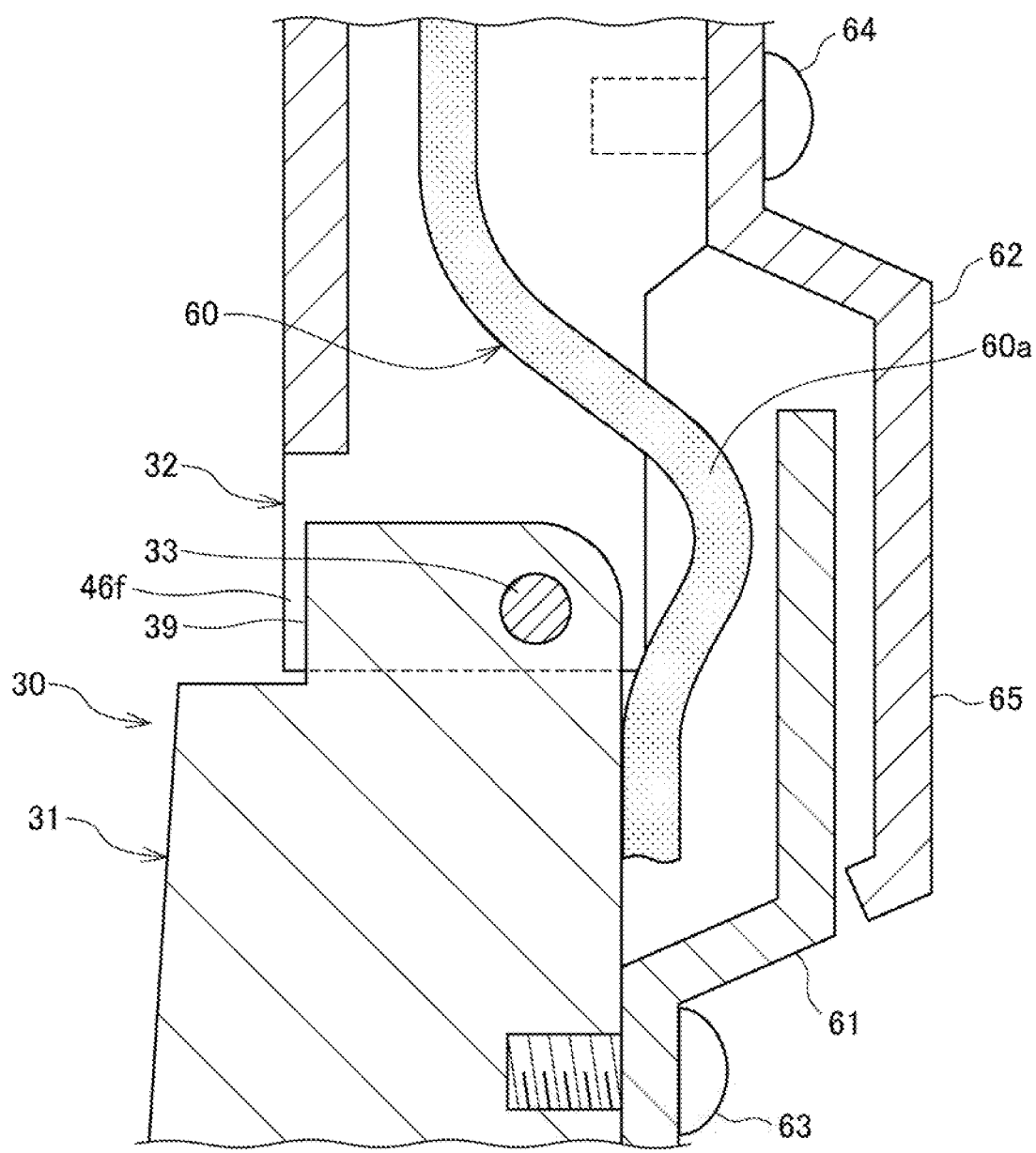
FIG. 11 is a schematic sectional view depicting a laying structure of a harness.

FIG. 11 is a schematic sectional view depicting a laying structure of a harness 60. FIG. 11 corresponds to a state in which the rear fender 25 is not rotated as in FIG. 3.

The harness 60 for the lamp 36 is laid along an inside surface in the vehicle width direction of the support member 30 from the side of the vehicle body on the front side, and is connected to the lamp 36.

The harness 60 includes a loose section 60a curved such as to be protuberant to an inner side in the vehicle width direction, at a part located on the inner side in the vehicle width direction of the rotating section 33.

The support section 30 includes a first cover 61 which covers an inside surface in the vehicle width direction of the first stay 31, and a second cover 62 which covers an inside surface in the vehicle width direction of the second stay 32.

The first cover 61 is fastened to an inside surface of the first stay 31 by a cover fastener 63 disposed on the front side as compared to the rotating section 33.

The second cover 62 is fastened to an inside surface of the second stay 32 by a cover fastener 64 disposed on the rear side as compared to the rotating section 33.

The first cover 61 extends rearward from the position of the cover fastener 63 beyond the rotating section 33.

The second cover 62 extends forward from the position of the cover fastener 64 beyond the rotating section 33.

The first cover 61 and the second cover 62 cover the rotating section 33 and the harness 60 from an inner side in the vehicle width direction.

The second cover 62 has at a front portion thereof an overlapping section 65 which covers the first cover 61 from an inner side in the vehicle width direction. At the overlapping section 65, the second cover 62 and the first cover 61 overlap with each other in side view of the vehicle. The overlapping section 65 covers the rotating section 33 and the harness 60 from an inner side in the vehicle width direction.

At the overlapping section 65, a labyrinth structure in which the gap between the first cover 61 and the second cover 62 is reduced is formed. By the labyrinth structure, intrusion of water and dust to the side of the rotating section 33 and the harness 60 is restrained.

Figure 12:
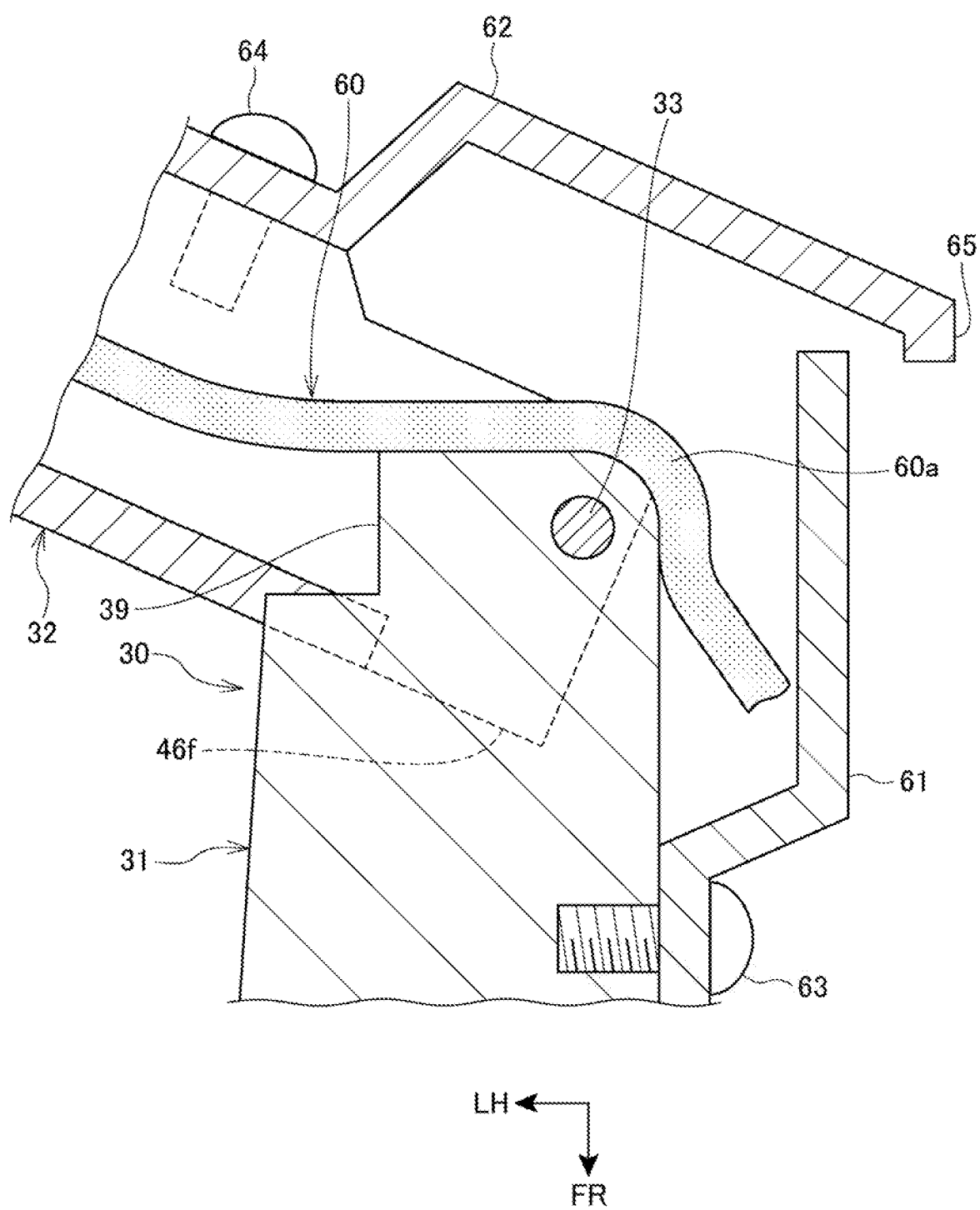
FIG. 12 is a schematic sectional view depicting a laying structure of the harness in a state in which the rear fender is rotated.

FIG. 12 is a schematic sectional view depicting a laying structure of the harness 60 in a state in which the rear fender 25 is rotated.

When the second stay 32 is rotated to an outer side in the vehicle width direction attendantly on the rotation of the rear fender 25, the loose section 60a of the harness 60 is deformed toward an outer side in the vehicle width direction.

Therefore, the deformation of the harness 60 attendant on the rotation of the rear fender 25 can be absorbed by the loose section 60a.

In addition, even in the state in which the rear fender 25 is rotated, the first cover 61 and the second cover 62 overlap partly with each other at the overlapping section 65. Therefore, intrusion of water and dust to the side of the rotating section 33 and the harness 60 can be restrained.

Besides, at the time of detaching the rear wheel 3 to the rear side, it is unnecessary to detach the rear fender 25 from the vehicle body; therefore, the laid state of the harness 60 in relation to the support member 30 and the rear fender 25 can be prevented from being changed at the time of an operation of detaching or attaching the rear wheel 3.

As has been described above, according to the first embodiment of the present invention, the swing arm 13 swingably supported on the vehicle body, the rear wheel 3 supported by the swing arm 13, and the rear fender 25 covering the rear wheel 3 from above, are provided, the rear fender 25 is supported in a rotatable manner, the rear fender 25 is supported by the swing arm 13, and the rear fender 25 is supported such as to be rotatable in the vehicle width direction by the rotating section 33.

According to this configuration, the rear fender 25 can be largely retracted relative to the rear wheel 3 by rotating the rear fender 25 in the vehicle width direction through the rotating section 33. Therefore, it becomes easy to perform maintenance work such as replacement of the rear wheel 3.

In addition, the rotational axis 33c of the rotating section 33 is directed in the longitudinal vehicle direction and in the vertical direction, in side view of the vehicle. Therefore, the rear fender 25 can be rotated in the vehicle width direction with the rotational axis 33c of the rotating section 33 as a center, so that the rear fender 25 can be largely retracted relative to the rear wheel 3.

Besides, the rotating section 33 is located on an outer side in the vehicle width direction in relation to the rear wheel 3.

According to this configuration, the rear fender 25 is rotated in the vehicle width direction through the rotating section 33 which is located on the outer side in the vehicle width direction relative to the rear wheel 3, so that the rear fender 25 can be largely retracted relative to the rear wheel 3.

Further, the two-wheeled motor vehicle 1 includes the first stay 31 extending from the swing arm 13 toward the outer circumference side of the rear wheel 3, and the second stay 32 rotatably connected to the first stay 31 through the rotating section 33, and the rear fender 25 is fixed to the second stay 32.

According to this configuration, the rear fender 25 can be provided to be rotatable in the vehicle width direction at a position on the outer circumference side of the rear wheel 3, by the first stay 31 and the second stay 32.

In addition, the fasteners 40a and 40b fastening the first stay 31 and the second stay 32 are provided detachably, and the rotation of the second stay 32 by the rotating section 33 is restricted by the fasteners 40a and 40b.

According to this configuration, the rotation of the second stay 32 and the rear fender 25 can be restricted with a simple structure by the fasteners 40a and 40b which fasten the first stay 31 and the second stay 32.

Besides, the rear fender 25 is co-fastened to the second stay 32 by the fasteners 40a and 40b.

According to this configuration, the rear fender 25 can be fixed by utilizing the fasteners 40a and 40b which restrict the rotation of the second stay 32, so that the number of component parts can be reduced.

In addition, the rear fender 25 is fastened to the second stay 32 by the fender fasteners 47a, 47b, and 47c which are provided separately from the fasteners 40a and 40b.

According to this configuration, even in a state in which the fasteners 40a and 40b are detached to make the second stay 32 rotatable, the rear fender 25 can be kept fixed to the second stay 32 by the fender fasteners 47a, 47b, and 47c.

Besides, the rotating section 33 is a shaft inserted in and passed through the first stay 31, and the second stay 32 is connected to the one end portion 33a and the other end portion 33b of the shaft.

According to this configuration, since the second stay 32 is connected to the one end portion 33a and the other end portion 33b of the rotating section 33, the first stay 31 and the second stay 32 can be connected firmly to each other through the rotating section 33.

In addition, the first stay 31 includes the extension section 39d extending toward the rear fender 25 side beyond the part where the rotating section 33 as a shaft is provided, and the fasteners 40a and 40b are fastened to the extension section 39d.

According to this configuration, the first stay 31 and the second stay 32 can be firmly fastened to each other with a simple structure. Besides, since the extension section 39d is provided on the first stay 31 side, the second stay 32 which is the side to be rotated can be lightened in weight.

Further, at least part of the extension section 39d is covered by the second stay 32 from an outer side in the vehicle width direction.

According to this configuration, the extension section 39d can be hidden behind the second stay 32 from the outer side in the vehicle width direction, so that external appearance property of the two-wheeled motor vehicle 1 is good.

In addition, the holding mechanism 53 that holds the rotational position of the rear fender 25 at a predetermined position is provided, the holding mechanism 53 includes the hole 53a, the ball 53b engaged with the hole 53a, and the biasing member 53c biasing the ball 53b toward the hole 53a, and the ball 53b is engaged with the hole 53a when the rear fender 25 is located at the predetermined position.

According to this configuration, the rotational position of the rear fender 25 can be held at the predetermined position by the holding mechanism 53.

Besides, the harness 60 is laid such as to lie along the inside surfaces in the vehicle width direction of the first stay 31 and the second stay 32, the first cover 61 covering the rotating section 33 and the harness 60 from an inner side in the vehicle width direction is attached to the first stay 31, the second cover 62 covering the rotating section 33 and the harness 60 from a vehicle width-directionally inner side is attached to the second stay 32, and the first cover 61 and the second cover 62 overlap with each other in the vehicle width direction.

According to this configuration, the harness 60 can be hidden and external appearance property can be thereby enhanced, and the rotating section 33 and the harness 60 can be protected from flying stones, water, and the like by the first cover 61 and the second cover 62.

In addition, the tiltable section 55 which is rotated in the vehicle width direction with the rotating section 33 as a center includes at least the rear fender 25, and, in a state in which the tiltable section 55 is rotated most greatly to an outer side in the vehicle width direction, the center of gravity G of the tiltable section 55 is located on the outer side in the vehicle width direction as compared to the rotational center of the rotating section 33, in a view along the axial direction of the rotating section 33.

According to this configuration, the tiltable section 55 can be kept in the state of being rotated most greatly to the outer side in the vehicle width direction, by a balance of the center of gravity G.

Second Embodiment

A second embodiment of the present invention will be described below, referring to FIGS. 13 to 17. In the second embodiment, the parts configured similarly to those in the first embodiment are denoted by the same reference symbols as used above, and descriptions thereof will be omitted.

The second embodiment differs from the first embodiment in that a rear fender 225 is supported by a support member 230 in a both end support fashion.

Figure 13:
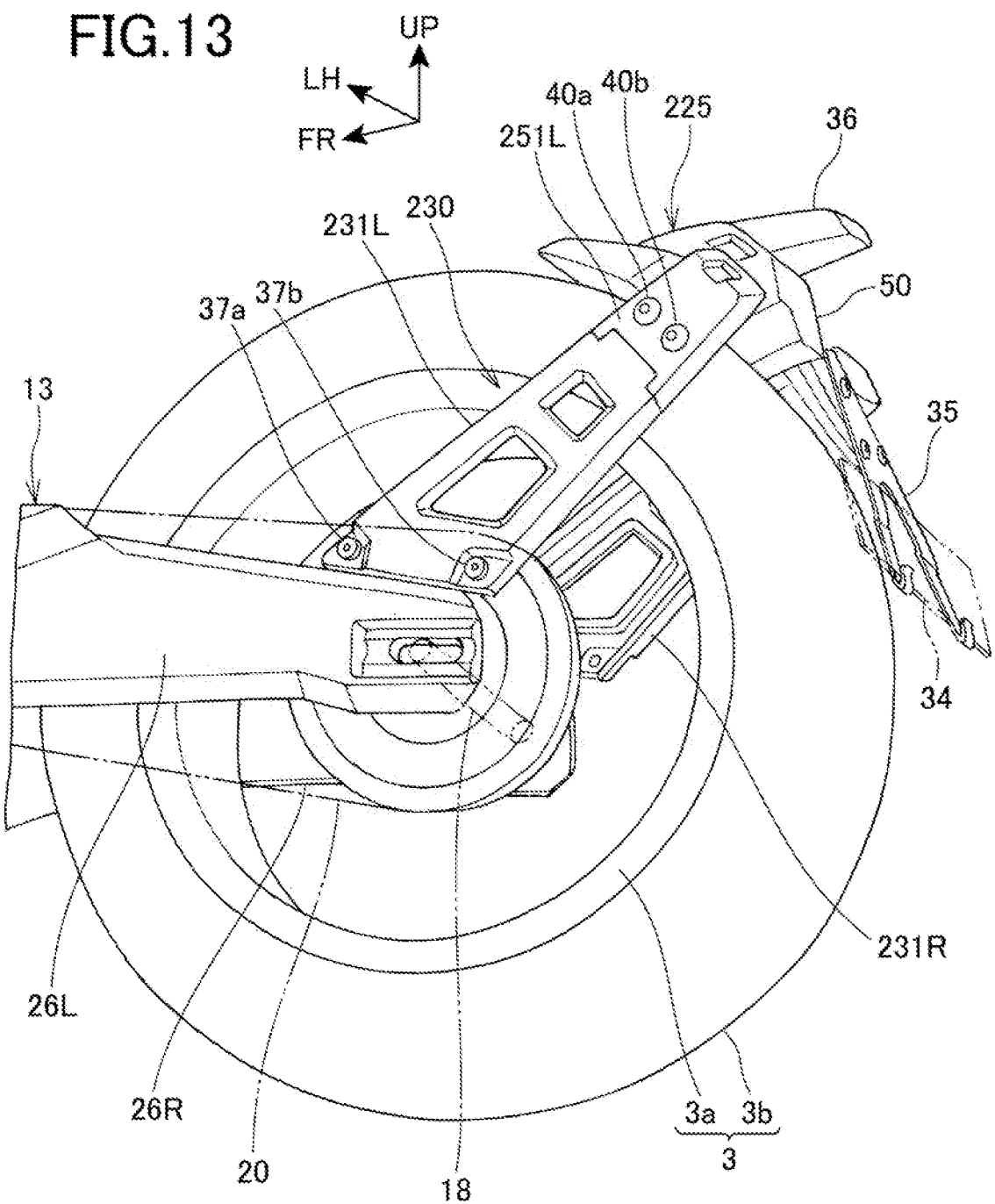
FIG. 13 is a perspective view, from a left side, of a support structure for a rear fender in a second embodiment.
Figure 14:
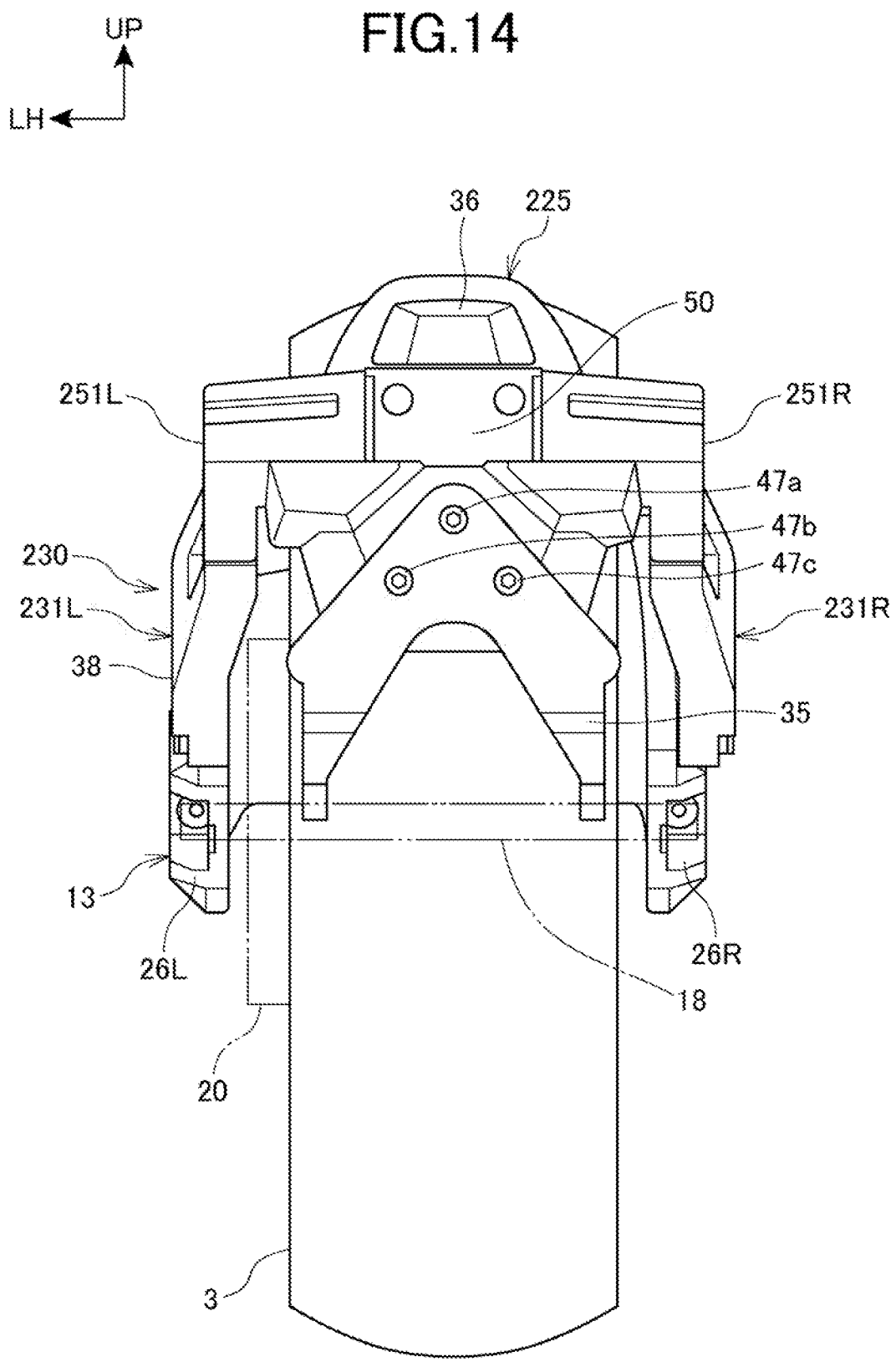
FIG. 14 is a view, from a rear side, of the support structure for the rear fender.
Figure 15:
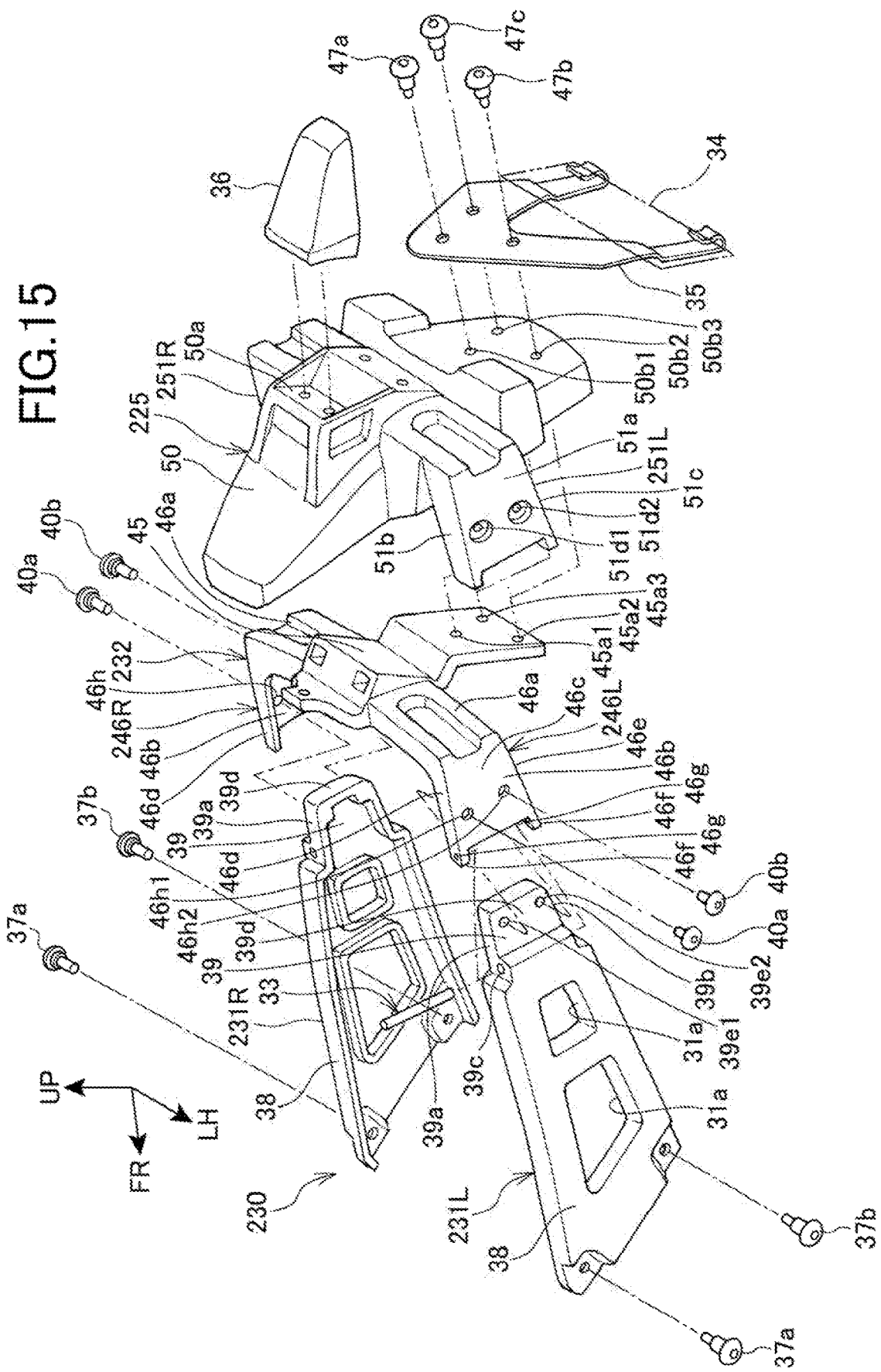
FIG. 15 is an exploded perspective view of the support structure for the rear fender.

FIG. 13 is a perspective view, from a left side, of a support structure for the rear fender 225 in the second embodiment. FIG. 14 is a view, from a rear side, of the support structure for the rear fender 225. FIG. 15 is an exploded perspective view of the support structure for the rear fender 225.

The support member 230 includes a pair of left and right first stays 231L and 231R, a second stay 232 connected to the first stays 231L and 231R, and a rotating section 33.

The rear fender 225 is attached to a rear surface of the second stay 232. A holder 35 and a lamp 36 are attached to the rear fender 225.

The first stay 231L on the left side is the same as the first stay 31 in the first embodiment, and is fixed to a rear end portion of an arm section 26L on the left side.

The first stay 231R on the right side is provided substantially in left-right symmetry with the first stay 231L on the left side, and is fixed to a rear end portion of an arm section 26R on the right side. Here, although the first stay 231R on the right side does not include a support hole 39*c* for supporting a rotating section 33, the other parts of the first stay 231R are provided in left-right symmetry with the first stay 231L on the left side.

The support member 230 is fixed to both the left and right arm sections 26L and 26R through the left and right first stays 231L and 231R, and supports the rear fender 225 in a both end support fashion.

The second stay 232 integrally includes a fender support section 45, a first stay connection section 246L connected to the first stay 231L, and a first stay connection section 246R connected to the first stay 231R.

Here, the first stay connection section 246L on the left side is the same as the first stay connection section 46L in the first embodiment. In addition, the first stay connection section 246R on the right side is formed substantially in left-right symmetry with the first stay connection section 246L on the left side.

The rear fender 225 integrally includes a fender main body 50, and a pair of left and right cover sections 251L and 251R extending forwardly downward from both left and right side portions of the fender main body 50.

Here, the cover section 251L on the left side is the same as the cover section 51 in the first embodiment. Besides, the cover section 251R on the right side is formed substantially in left-right symmetry with the cover section 251L on the left side.

Figure 16:
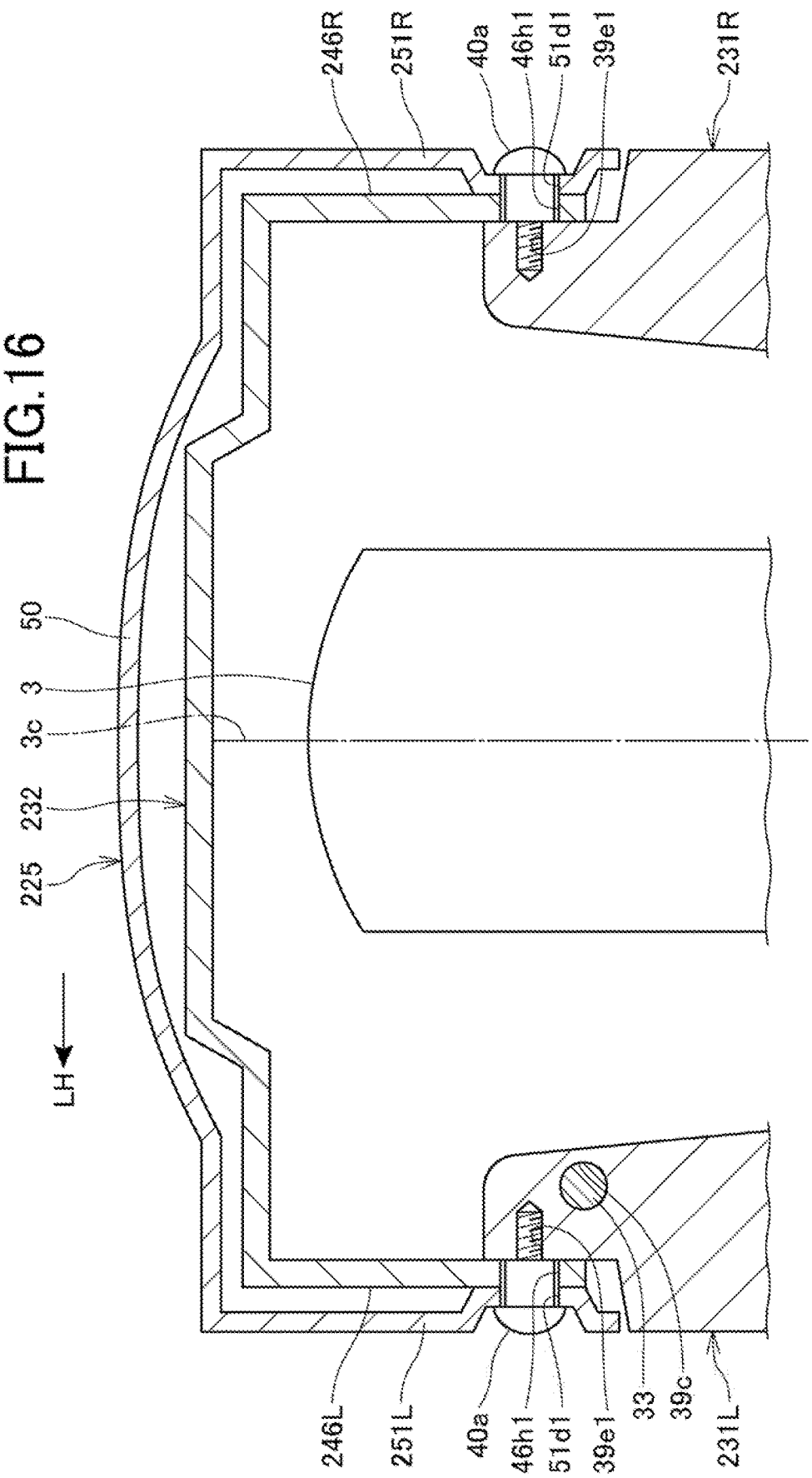
FIG. 16 is a sectional view schematically depicting the structure of a connection section between a second stay and a first stay.

FIG. 16 is a sectional view schematically depicting the structure of a connection section between the second stay 232 and the first stays 231L and 231R. Here, FIG. 16 is a sectional view as viewed in the axial direction of the rotating section 33.

Referring to FIGS. 15 and 16, the second stay 232 is connected to both ends of the rotating section 33 provided at the first stay 231L on the left side through the upper and lower connection pieces 46*f*.

In addition, the first stay connection section 246L on the left side of the second stay 232 is fastened to the fixing holes 39*e*1 and 39*e*2 in the first stay 231L on the left side, by the fasteners 40*a* and 40*b* inserted in and passed through the fixing holes 46*h*1 and 46*h*2 in the second stay 32 from an outer side in the vehicle width direction.

The first stay connection section 246R on the right side of the second stay 232 is fastened to the fixing holes 39*e*1 and 39*e*2 in the first stay 231R on the right side, by the fasteners 40*a* and 40*b* inserted in and passed through the fixing holes 46*h*1 and 46*h*2 in the second stay 32 from an outer side in the vehicle width direction.

The left and right cover sections 251L and 251R of the rear fender 25 are disposed to cover the left and right front extension sections 46*b* of the second stay 232 from outside, and are co-fastened to the first stay 231R together with the second stay 232 by the left and right fasteners 40*a* and 40*b*.

When the left and right fasteners 40*a* and 40*b* are all detached, the restriction on the rotation of the second stay 232 is released, and it becomes possible to rotate the rear fender 225 together with the second stay 232 in the vehicle width direction.

Figure 17:
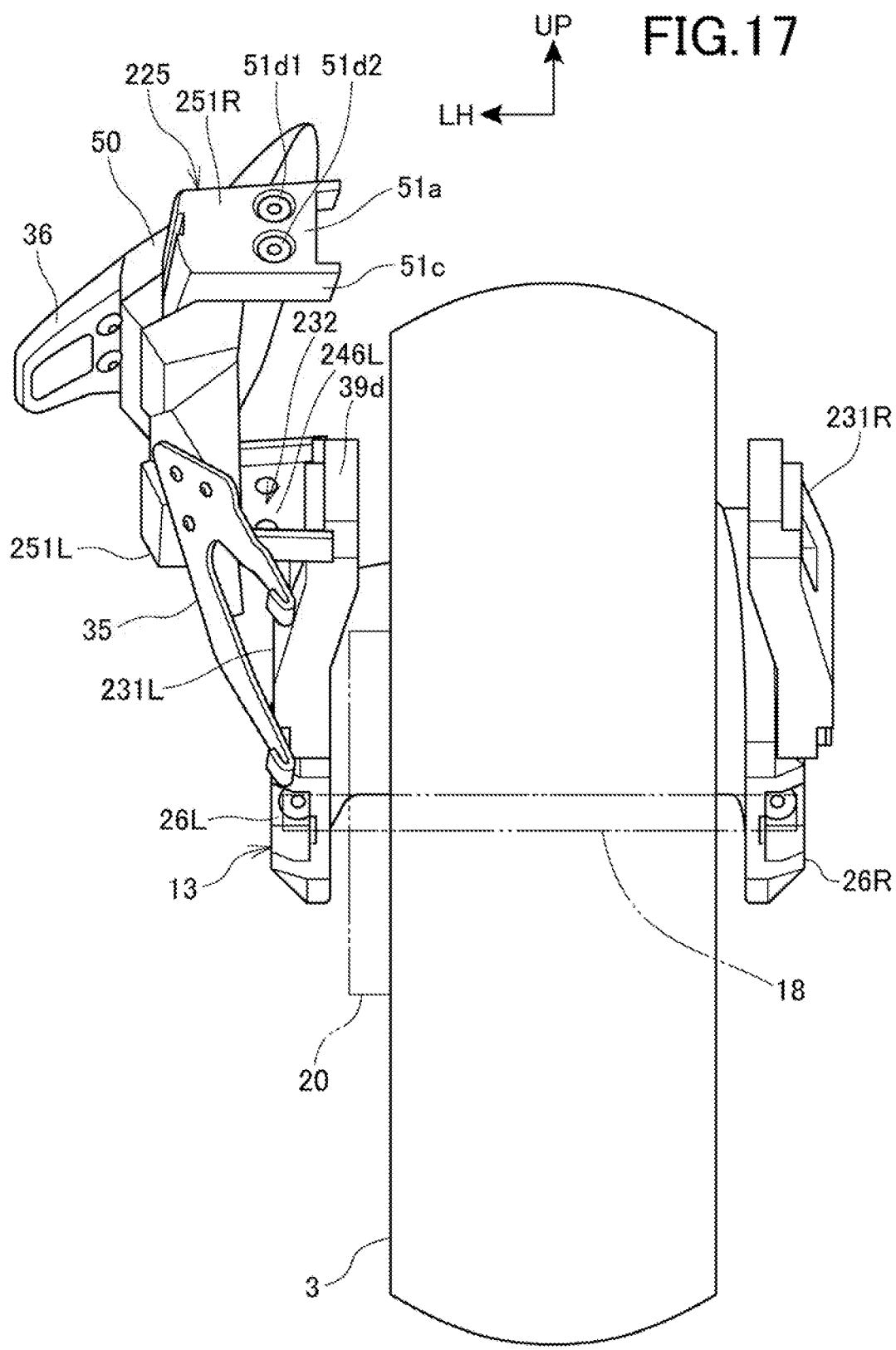
FIG. 17 is a view, from a rear side, of a state in which the rear fender is rotated toward an outer side in the vehicle width direction.

FIG. 17 is a view, from a rear side, of a state in which the rear fender 225 is rotated to an outer side in the vehicle width direction.

In the state of FIG. 14, the rear fender 225 is located just on the rear side of an upper portion of the rear wheel 3.

When the rear fender 225 is rotated to an outer side in the vehicle width direction with the rotational axis 33*c* (FIG. 6) as a center from the state of FIG. 14, the rear fender 225 is moved to the outer side in the vehicle width direction and retracted from the rear wheel 3, as depicted in FIG. 17.

Specifically, as illustrated in FIG. 17, in a state in which the rear fender 225 is rotated to the most outer side in the vehicle width direction, the second stay 232 and the rear fender 225 do not overlap with the rear wheel 3 and are located at positions spaced outward from the rear wheel 3 in rear view.

In this state, since the second stay 232 and the rear fender 225 are not present in the moving course when the rear wheel 3 is drawn out from between the left and right arm sections 26L and 26R, the rear wheel 3 can be drawn out rearward from between the left and right arm sections 26L and 26R and detached.

Besides, even in this state, the rear fender 225 is connected to the vehicle body side through the rotating section 33, so that the rear fender 225 can easily be returned into the state of FIG. 14.

Third Embodiment

A third embodiment of the present invention will be described below, referring to FIGS. 18 and 19. In the third embodiment, the parts configured similarly to those in the first embodiment are denoted by the same reference symbols as used above, and descriptions thereof will be omitted.

The third embodiment differs from the first embodiment in the fastening structure for a first stay 331 and a second stay 322.

Figure 18:
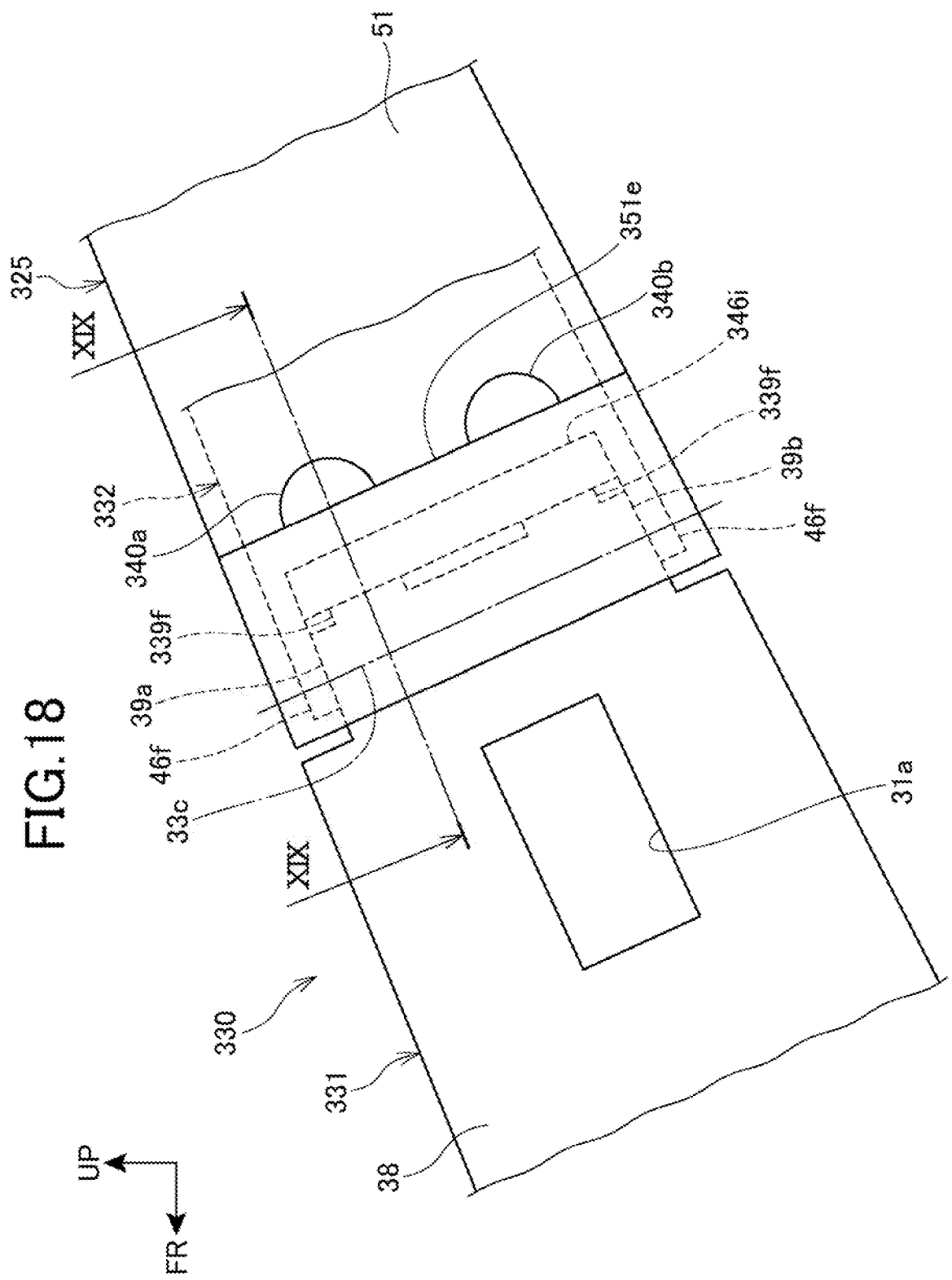
FIG. 18 is a left side view depicting the structure of a connection section between a first stay and a second stay, in a third embodiment.
Figure 19:
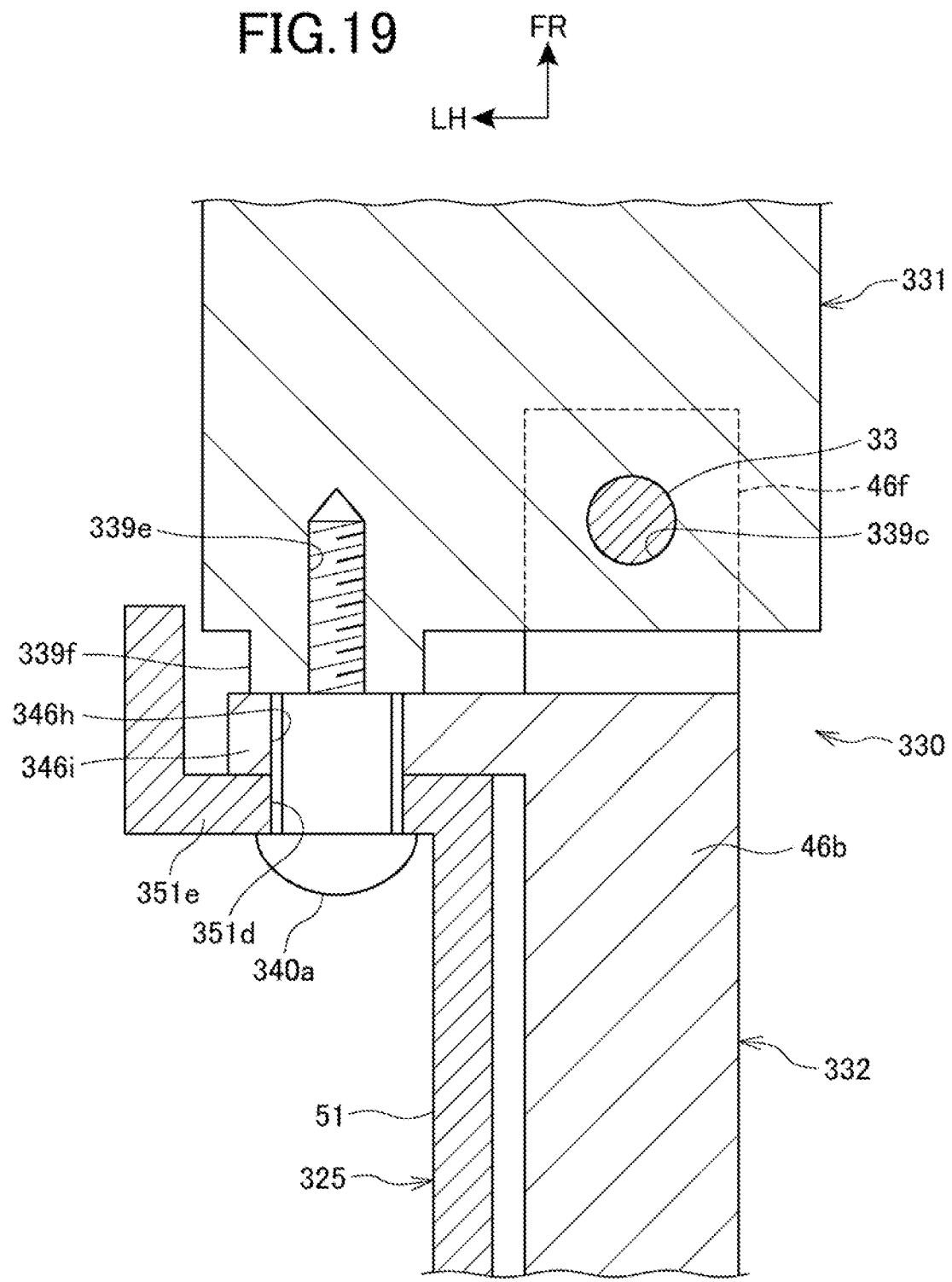
FIG. 19 is a sectional view taken along line XIX-XIX of FIG. 18.

FIG. 18 is a left side view depicting the structure of a connection section between the first stay 331 and the second stay 332, in the third embodiment. FIG. 19 is a sectional view taken along line XIX-XIX of FIG. 18.

A rear fender 325 is supported by a support member 330 which is fixed to a swing arm 13.

The support member 330 includes the first stay 331 fixed to an arm section 26L, the second stay 332 provided to be rotatable in the vehicle width direction relative to the first stay 331, and a rotating section 33 rotatably connecting the second stay 332 to the first stay 331. The first stay 331 and the second stay 332 are fastened by a plurality of fasteners 340a and 340b disposed in the state of being aligned on upper and lower sides.

The first stay 331 differs from the first stay 31 in the first embodiment above in the structure of a rear end portion, but is the same as the first stay 31 in other parts.

The second stay 332 differs from the second stay 32 in the first embodiment above in the structure of a front end portion, but is the same as the second stay 32 in other parts.

The first stay 331 includes an upper-side stepped section 39a and a lower-side stepped section 39b at a rear end portion thereof.

The first stay 331 includes a support hole 339c which penetrates from the upper-side stepped section 39a to the lower-side stepped section 39b. A rotating section 33 is inserted in and passed through the support hole 339c.

In addition, a rear end surface of the first stay 331 is provided with a plurality of fixing holes 339e aligned vertically. The fixing holes 339e are formed in a boss section 339f projecting rearward from the rear end surface of the first stay 331. The fixing holes 339e are provided on an outer side in the vehicle width direction as compared to the support hole 339c.

The second stay 332 includes connection pieces 46f at an upper end and a lower end of a front edge portion of a front extension section 46b.

Besides, the second stay 332 includes a fixing piece 346i extending outward in the vehicle width direction from a front end portion of the front extension section 46b. The fixing piece 346i is provided on the rear side as compared to the connection piece 46f.

The fixing piece 346i is provided with fixing holes 346h penetrating the fixing piece 346i in the front-rear direction. Note that the second stay 332 does not have the fixing holes 46h1 and 46h2 in the first embodiment above.

The second stay 332 is connected to both ends of the rotating section 33 provided at the first stay 331, through the upper and lower connection pieces 46f. The second stay 232 is rotatable in the vehicle width direction, with the rotational axis 33c of the rotating section 33 as a center.

The fixing piece 346i of the second stay 332 makes contact with the boss section 339f from the rear side, and is fastened to the fixing hole 339e of the first stay 331 by fasteners 340a and 340b which are inserted in and passed through the fixing holes 346h from the rear side. In other words, the first stay 331 and the second stay 332 are fastened together in the front-rear direction by the fasteners 340a and 340b.

The fasteners 340a and 340b restrict the rotation of the second stay 332 with the rotational axis 33c as a center.

When the fasteners 340a and 340b are all detached, the restriction on the rotation of the second stay 332 is released, so that it becomes possible to rotate the rear fender 325 together with the second stay 332 in the vehicle width direction.

The rear fender 325 includes a cover extension section 351e extending outward in the vehicle width direction from a front edge portion of the cover section 51.

The cover extension section 351e includes a plurality of fixing holes 351d penetrating the cover extension section 351e in the front-rear direction. Note that the rear fender 325 does not have the fixing holes 51d1 and 51d2 in the first embodiment above. The cover extension section 351e covers the fixing piece 346i of the second stay 332 from the rear side.

The rear fender 325 is co-fastened to the first stay 331 together with the second stay 332, by the fasteners 340a and 340b inserted in and passed through the fixing holes 351d in the cover extension section 351e from the rear side.

Fourth Embodiment

A fourth embodiment of the present invention will be described below, referring to FIGS. 20 and 21. In the fourth embodiment, the parts configured similarly to those in the first embodiment are denoted by the same reference symbols as used above, and descriptions thereof will be omitted.

The fourth embodiment differs from the first embodiment in the fastening structure for a first stay 431 and a second stay 432.

Figure 20:
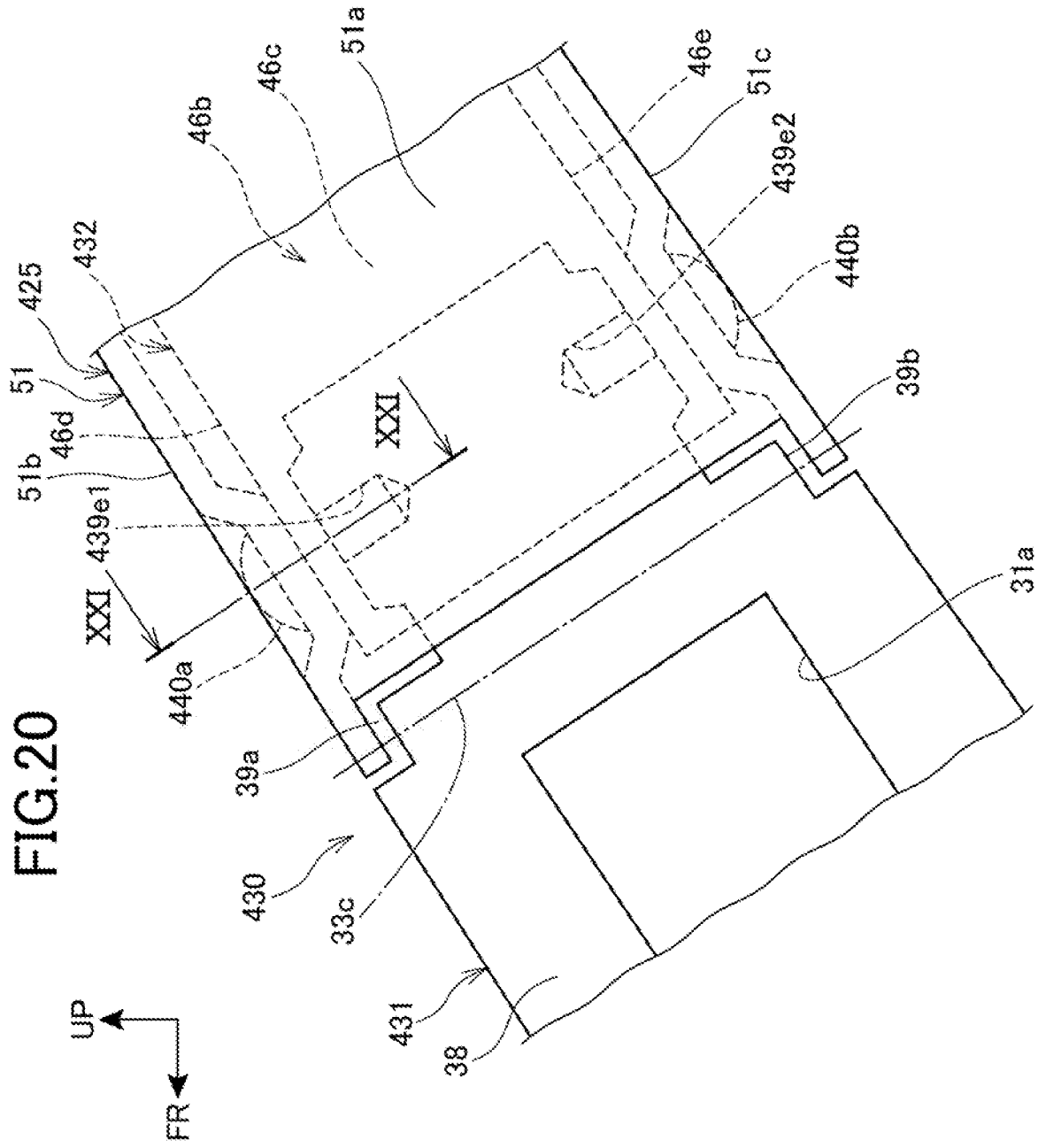
FIG. 20 is a left side view depicting the structure of a connection section between a first stay and a second stay, in a fourth embodiment.
Figure 21:
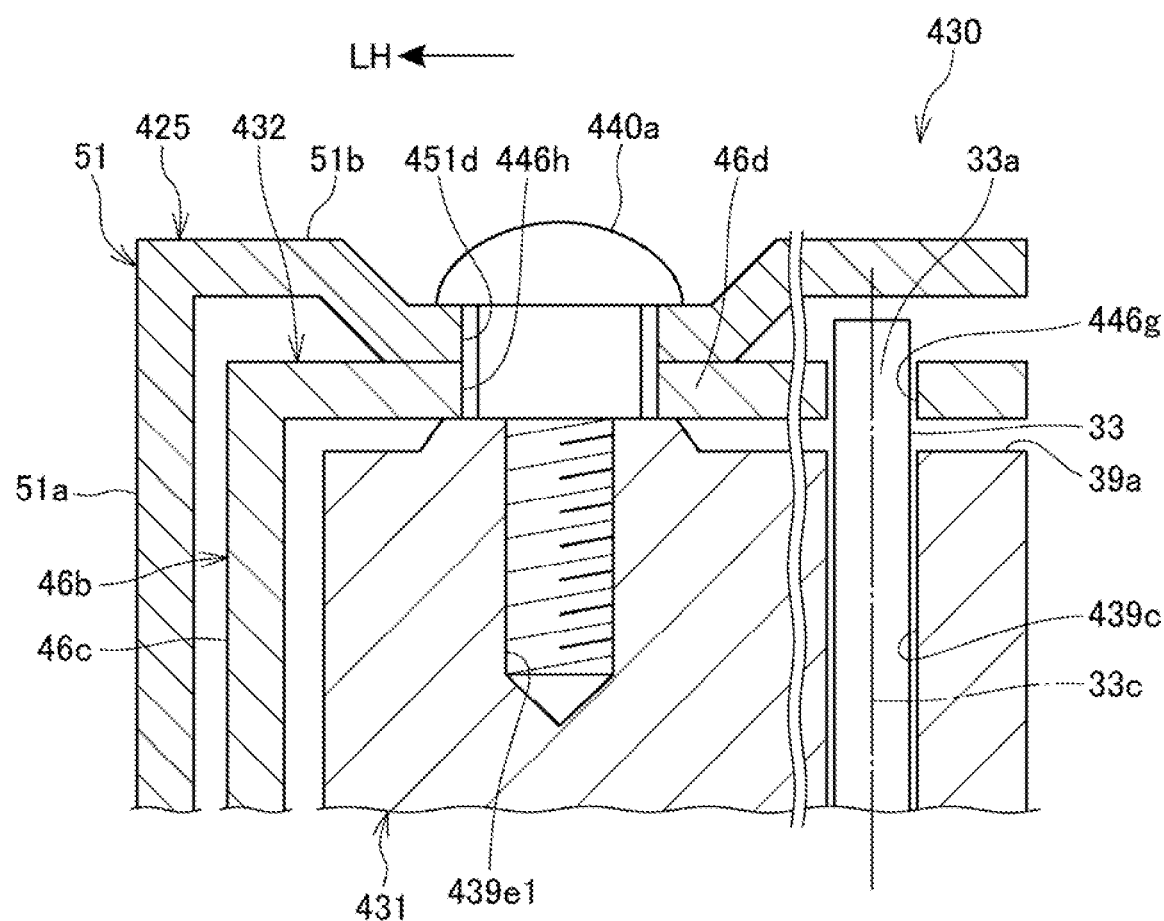
FIG. 21 is a sectional view taken along line XXI-XXI of FIG. 20.

FIG. 20 is a left side view depicting the structure of a connection section between the first stay 431 and the second stay 432 in the fourth embodiment. FIG. 21 is a sectional view taken along line XXI-XXI of FIG. 20.

A rear fender 425 is supported by a support member 430 fixed to a swing arm 13.

The support member 430 includes the first stay 431 fixed to an arm section 26L, the second stay 432 provided to be rotatable in the vehicle width direction relative to the first stay 431, and a rotating section 33 rotatably connecting the second stay 432 to the first stay 431. The first stay 431 and the second stay 432 are fastened together by a plurality of fasteners 440a and 440b.

The first stay 431 differs from the first stay 31 in the first embodiment in the structure of a rear end portion, but is the same as the first stay 31 in other parts.

The second stay 432 differs from the second stay 32 in the first embodiment in the structure of a front end portion, but is the same as the second stay 32 in other parts.

The first stay 431 includes an upper-side stepped section 39a and a lower-side stepped section 39b at a rear end portion thereof.

The first stay 431 includes a support hole 439c penetrating from the upper-side stepped section 39a to the lower-side stepped section 39b. A rotating section 33 is inserted in and passed through the support hole 439c.

In addition, an upper surface and a lower surface of a rear end portion of the first stay 431 are provided with fixing holes 439e1 and 439e2, respectively. The fixing holes 439e1 and 439e2 are provided on the rear side and an outer side in the vehicle width direction as compared to the support hole 439c.

At a front end portion of a front extension section 46b of the second stay 432, an upper wall section 46d and a lower wall section 46e are each provided with a connection hole 446g.

The second stay 432 is connected to both ends of the rotating section 33 provided at the first stay 431, through the upper and lower connection holes 446g. The second stay 432 is rotatable in the vehicle width direction, with the rotational axis 33c of the rotating section 33 as a center.

In addition, the second stay 432 is provided with fixing holes 446h which vertically penetrate the upper wall section 46d and the lower wall section 46e of the front extension section 46b. Note that the second stay 432 does not have the fixing holes 46h1 and 46h2 in the first embodiment above.

The second stay 432 is fastened to the upper and lower fixing holes 439e1 and 439e2 in the first stay 431 by upper and lower fasteners 440a and 440b which are inserted in and passed through the upper and lower fixing holes 446h in the front extension section 46b in the vertical direction. In other words, the first stay 431 and the second stay 432 are fastened together in the vertical direction by the fasteners 440a and 440b.

The fasteners 440a and 440b restrict the rotation of the second stay 432 with the rotational axis 33c as a center.

When the fasteners 440a and 440b are all detached, the restriction on the rotation of the second stay 432 is released, so that it becomes possible to rotate the rear fender 425 together with the second stay 432 in the vehicle width direction.

A cover section 51 of the rear fender 425 is provided with fixing holes 451d which vertically penetrate a cover upper wall section 51b and a cover lower wall section 51c. Note that the rear fender 425 does not have the fixing holes 51d1 and 51d2 in the first embodiment above.

The cover section 51 covers the front extension section 46b of the second stay 432 from outside. The rear fender 425 is co-fastened to the first stay 431 together with the second stay 432, by the upper and lower fasteners 440a and 440b which are inserted in and passed through the fixing holes 451d in the cover section 51 in the vertical direction.

Note that the first to fourth embodiments described above illustrate modes of the present invention, and the present invention is not limited to the first to fourth embodiments.

In the first embodiment above, the rear fender 25 and the second stay 32 have been described to be provided as separate bodies, but this is not limitative; for example, the rear fender 25 and the second stay 32 may be integrally formed by resin molding.

In addition, in the first embodiment above, the rotating section 33 has been described as being a shaft, but this is not limitative of the present invention. It is sufficient that the rotating section is one whose rotational axis is directed at least in either of the longitudinal vehicle direction or the vertical direction. For example, the first stay 31 and the second stay 32 may be provided as one body, part of a connection section between the first stay 31 and the second stay 32 may be reduced in thickness to provide a thin hinge, and the rear fender 25 may be rotated in the vehicle width direction, with the rotational axis of the thin hinge as a center.

Besides, in the first embodiment above, the rotational axis 33c of the rotating section 33 has been described to be directed in the longitudinal vehicle direction and the vertical direction in side view of the vehicle, but this is not limitative of the present invention. The rotational axis 33c may be directed in only the longitudinal vehicle direction, or may be directed in only the vertical direction, insofar as the rear fender 25 can be rotated in the vehicle width direction.

In addition, in the first embodiment above, the second stay 32, the rear fender 25, the holder 35, and the lamp 36 have been described to constitute the tiltable section 55, but this is not limitative. It is sufficient that the tiltable section 55 includes at least the rear fender.

Besides, in the first embodiment above, the saddle riding vehicle has been described by taking the two-wheeled motor vehicle 1 as an example, but this is not limitative of the present invention. The present invention is applicable to three-wheeled saddle riding vehicle including two front wheels or two rear wheels, and saddle riding vehicles including four or more wheels.

DESCRIPTION OF REFERENCE SYMBOLS

1 Two-wheeled motor vehicle (Saddle riding vehicle)
3 Rear wheel
13 Swing arm
25, 225, 325, 425 Rear fender
31, 231L, 331, 431 First stay
32, 232, 332, 432 Second stay
33 Rotating section
33a One end portion (End of shaft)
33b Other end portion (End of shaft)
33c Rotational axis
39d Extension section
40a, 40b, 340a, 340b, 440a, 440b Fastener
47a, 47b, 47c Fender fastener
53 Holding mechanism
53a Hole
53b Ball
53c Biasing member
55 Tiltable section
60 Harness
61 First cover
62 Second cover
G Center of gravity

The invention claimed is:

1. A saddle riding vehicle including a swing arm swingably supported on a vehicle body, a rear wheel supported by the swing arm, and a rear fender covering the rear wheel from an upper side, the rear fender being supported rotatably, wherein
the rear fender is supported by the swing arm, and
the rear fender is supported rotatably in a vehicle width direction by a rotating section.

2. The saddle riding vehicle according to claim 1, wherein a rotational axis of the rotating section is directed at least in either of a longitudinal vehicle direction or a vertical direction, in side view of the vehicle.

3. The saddle riding vehicle according to claim 1, wherein the rotating section is located on an outer side in the vehicle width direction relative to the rear wheel.

4. The saddle riding vehicle according to claim 1, further comprising:
a first stay extending from the swing arm toward an outer circumference side of the rear wheel; and
a second stay rotatably connected to the first stay through the rotating section, wherein
the rear fender is fixed to the second stay.

5. The saddle riding vehicle according to claim 4, wherein a fastener for fastening the first stay and the second stay is provided detachably, and rotation of the second stay by the rotating section is restricted by the fastener.

6. The saddle riding vehicle according to claim 5, wherein the rear fender is co-fastened with the second stay by the fastener.

7. The saddle riding vehicle according to claim 6, wherein the rear fender is fastened to the second stay by a fender fastener provided separately from the fastener.

8. The saddle riding vehicle according to claim 4, wherein the rotating section is a shaft inserted in and passed through the first stay, and the second stay is connected to both ends of the shaft.

9. The saddle riding vehicle according to claim 5, wherein
the rotating section is a shaft inserted in and passed through the first stay, the second stay is connected to both ends of the shaft, the first stay includes an extension section extending to the rear fender side as compared to a part where the shaft is provided, and the fastener is fastened to the extension section.

10. The saddle riding vehicle according to claim 9, wherein
at least part of the extension section is covered by the second stay from an outer side in a vehicle width direction.

11. The saddle riding vehicle according to claim 1, wherein
a holding mechanism for holding a rotational position of the rear fender at a predetermined position is provided, the holding mechanism includes a hole, a ball engaged with the hole, and a biasing member for biasing the ball toward the hole, and the ball is engaged with the hole when the rear fender is located at the predetermined position.

12. The saddle riding vehicle according to claim 4, wherein
a harness is laid in such a manner as to lie along inside surfaces in the vehicle width direction of the first stay and the second stay, a first cover covering the rotating section and the harness from an inner side in the vehicle width direction is attached to the first stay, while a second cover covering the rotating section and the harness from a vehicle width-directionally inner side is attached to the second stay, and the first cover and the second cover overlap with each other in the vehicle width direction.

13. The saddle riding vehicle according to claim 1, wherein
a tiltable section rotated in the vehicle width direction with the rotating section as a center includes at least the rear fender, and in a state in which the tiltable section is rotated most greatly to an outer side in the vehicle width direction, a center of gravity of the tiltable section is located on an outer side in the vehicle width direction as compared to a rotational center of the rotating section, as viewed along an axial direction of the rotating section.

* * * * *